United States Patent
Stoffel et al.

(10) Patent No.: US 9,936,636 B2
(45) Date of Patent: *Apr. 10, 2018

(54) CUTTING BLADE WITH HARDENED REGIONS

(71) Applicants: Neal J. Stoffel, Campbellsport, WI (US); Keith A. Johnson, Kewaskum, WI (US); Andrew J. Theisen, Fond du Lac, WI (US)

(72) Inventors: Neal J. Stoffel, Campbellsport, WI (US); Keith A. Johnson, Kewaskum, WI (US); Andrew J. Theisen, Fond du Lac, WI (US)

(73) Assignee: Kondex Corporation, Lomira, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/606,603

(22) Filed: May 26, 2017

(65) Prior Publication Data

US 2017/0258006 A1 Sep. 14, 2017

Related U.S. Application Data

(63) Continuation of application No. 14/708,649, filed on May 11, 2015, now Pat. No. 9,686,911, which is a
(Continued)

(51) Int. Cl.
*A01D 34/66* (2006.01)
*B23K 20/00* (2006.01)
(Continued)

(52) U.S. Cl.
CPC ......... *A01D 34/736* (2013.01); *A01D 34/661* (2013.01); *A01D 34/73* (2013.01);
(Continued)

(58) Field of Classification Search
CPC .... A01D 34/01; A01D 34/015; A01D 34/412; A01D 34/664; A01D 34/73; B23P 15/40; B23P 15/403
(Continued)

(56) References Cited

U.S. PATENT DOCUMENTS 2,529,797 A 11/1950 Cauble
2,608,111 A * 8/1952 Ratkowski ............... E02F 9/285
37/460

(Continued)

FOREIGN PATENT DOCUMENTS

CN 202 085 483 U 12/2011
EP 0462484 A2 12/1991
(Continued)

OTHER PUBLICATIONS

Harvesting Equipment—Blades for Agricultural Rotary Mowers—Requirements; International Standard ISO 5718; Jul. 15, 2002; 10 pages; First edition; Geneva, Switzerland.
(Continued)

*Primary Examiner* — John Weiss
(74) *Attorney, Agent, or Firm* — Reinhart Boerner Van Deuren P.C.

(57) ABSTRACT

A blade for a mower disc body is provided. The blade includes a cutting blade body of a first base material, top and bottom surfaces and an outer surface that extends around the cutting blade body vertically between the top and bottom surfaces. The blade further includes a cutting edge formed along the outer surface and a plurality of clad beads extending along one of the top and bottom surfaces transversely away from the non-serrated cutting edge.

21 Claims, 16 Drawing Sheets

Related U.S. Application Data continuation-in-part of application No. 14/708,466, filed on May 11, 2015.

(60) Provisional application No. 61/991,938, filed on May 12, 2014, provisional application No. 62/036,490, filed on Aug. 12, 2014, provisional application No. 62/081,897, filed on Nov. 19, 2014.

(51) Int. Cl.
  *A01D 34/73* (2006.01)
  *A01D 101/00* (2006.01)

(52) U.S. Cl.
  CPC ............ *A01D 34/733* (2013.01); *B23K 20/00* (2013.01); *A01D 2101/00* (2013.01)

(58) Field of Classification Search
  USPC .................... 56/295, 289; 83/663; 76/115
  See application file for complete search history.

(56) References Cited

U.S. PATENT DOCUMENTS

| | | | |
|---|---|---|---|
| 3,063,310 A | 11/1962 | Connoy | |
| 3,859,865 A | 1/1975 | Conrad | |
| 3,866,491 A * | 2/1975 | Marchard | B26F 1/00 76/101.1 |
| 3,937,317 A | 2/1976 | Fleury | |
| 3,944,443 A | 3/1976 | Jones | |
| 3,975,891 A * | 8/1976 | Gunther | A01D 34/73 30/350 |
| 4,416,656 A | 11/1983 | Shapiro | |
| 4,451,302 A | 5/1984 | Prescott et al. | |
| 4,466,533 A | 8/1984 | Shwayder | |
| 4,516,302 A | 5/1985 | Chulada et al. | |
| 4,530,204 A | 7/1985 | Brooks | |
| 4,645,404 A | 2/1987 | Juravic | |
| 4,660,361 A | 4/1987 | Remillard et al. | |
| 4,666,033 A | 5/1987 | Reid | |
| 4,842,126 A | 6/1989 | McConnell | |
| 4,909,026 A | 3/1990 | Molzahn et al. | |
| 4,949,836 A | 8/1990 | Schostek | |
| 5,016,747 A | 5/1991 | Veenhof | |
| 5,092,453 A | 3/1992 | Bruke | |
| 5,181,461 A | 1/1993 | Viaud | |
| 5,209,053 A | 5/1993 | Verbeek | |
| 5,213,202 A | 5/1993 | Arnold | |
| 5,444,969 A | 8/1995 | Wagstaff et al. | |
| 5,673,618 A | 10/1997 | Little | |
| 5,823,449 A | 10/1998 | Kooima et al. | |
| 5,906,053 A * | 5/1999 | Turner | A01D 34/73 30/347 |
| 6,089,334 A | 7/2000 | Watts | |
| 6,155,705 A | 12/2000 | Douris et al. | |
| 6,402,438 B1 | 6/2002 | Boyer | |
| 6,543,211 B1 | 4/2003 | Talbot | |
| 6,594,975 B2 | 7/2003 | Anstey et al. | |
| 6,857,255 B1 * | 2/2005 | Wilkey | A01D 34/13 56/296 |
| 6,962,040 B2 | 11/2005 | Talbot | |
| 7,140,113 B2 * | 11/2006 | King | B26B 21/58 30/346.54 |
| 7,478,522 B1 | 1/2009 | Lovett et al. | |
| 7,677,843 B2 * | 3/2010 | Techel | A01F 29/09 407/113 |
| 7,827,883 B1 | 11/2010 | Cherng et al. | |
| 8,096,221 B2 * | 1/2012 | Tarrerias | B23D 65/00 76/104.1 |
| 8,353,148 B2 | 1/2013 | Derscheid | |
| 8,464,506 B2 | 6/2013 | Schumacher et al. | |
| 8,484,938 B2 | 7/2013 | Cormier et al. | |
| 8,579,774 B2 | 11/2013 | Derscheid | |
| 8,662,131 B2 | 3/2014 | Cormier et al. | |
| 8,662,132 B2 | 3/2014 | Cormier et al. | |
| 8,714,053 B2 * | 5/2014 | Krauter | B22F 7/062 219/54 |
| 2002/0131328 A1 | 9/2002 | Bowens et al. | |
| 2003/0101706 A1 * | 6/2003 | Kenny | A01D 34/005 56/255 |
| 2005/0241440 A1 | 11/2005 | Beck | |
| 2007/0163128 A1 | 7/2007 | Tarrerias | |
| 2007/0261867 A1 | 11/2007 | Techel et al. | |
| 2008/0006016 A1 | 1/2008 | Snider et al. | |
| 2008/0078656 A1 | 4/2008 | Rhodea et al. | |
| 2009/0095214 A1 | 4/2009 | Whitfield | |
| 2009/0322143 A1 | 12/2009 | Krauter | |
| 2011/0009251 A1 | 1/2011 | Derscheid | |
| 2011/0067374 A1 | 3/2011 | James et al. | |
| 2012/0060379 A1 | 3/2012 | Culf | |
| 2012/0063871 A1 | 3/2012 | Wood | |
| 2012/0233974 A1 | 9/2012 | Cormier et al. | |
| 2013/0032047 A1 | 2/2013 | Marques et al. | |
| 2013/0111863 A1 | 5/2013 | Johnson et al. | |
| 2013/0233145 A1 | 9/2013 | Sotelo | |
| 2014/0041537 A1 | 2/2014 | Hubach et al. | |
| 2014/0045562 A1 * | 2/2014 | Adamczyk | A01F 29/02 460/112 |
| 2014/0215787 A1 * | 8/2014 | Wada | B23P 6/00 29/402.18 |
| 2014/0230394 A1 * | 8/2014 | Zerbarini | A01D 34/52 56/16.7 |
| 2015/0319922 A1 * | 11/2015 | Stoffel | A01D 34/73 56/14.7 |
| 2016/0157423 A1 | 6/2016 | Stoffel | |

FOREIGN PATENT DOCUMENTS

| | | |
|---|---|---|
| EP | 2 200 914 | 3/2009 |
| EP | 2 371 205 A1 | 10/2011 |
| EP | 2 499 896 A1 | 9/2012 |
| JP | 7-24986 | 6/1995 |
| JP | 2006020531 A | 1/2006 |
| JP | 2009011223 A | 1/2009 |
| JP | 2009126608 A | 6/2009 |
| KR | 101 317 832 B1 | 10/2013 |

OTHER PUBLICATIONS

Hyungson Ki et al.; Process map for laser heat treatment of carbon steels; Optics & Laser Technology; 2012, 9 pages (2106-2114) vol. 44.

Sangwoo So et al.; Effect of specimen thickness on heat treatability in laser transformation hardening; International Journal of Heat and Mass Transfer; 2013; 11 pages (266-276); vol. 61.

* cited by examiner

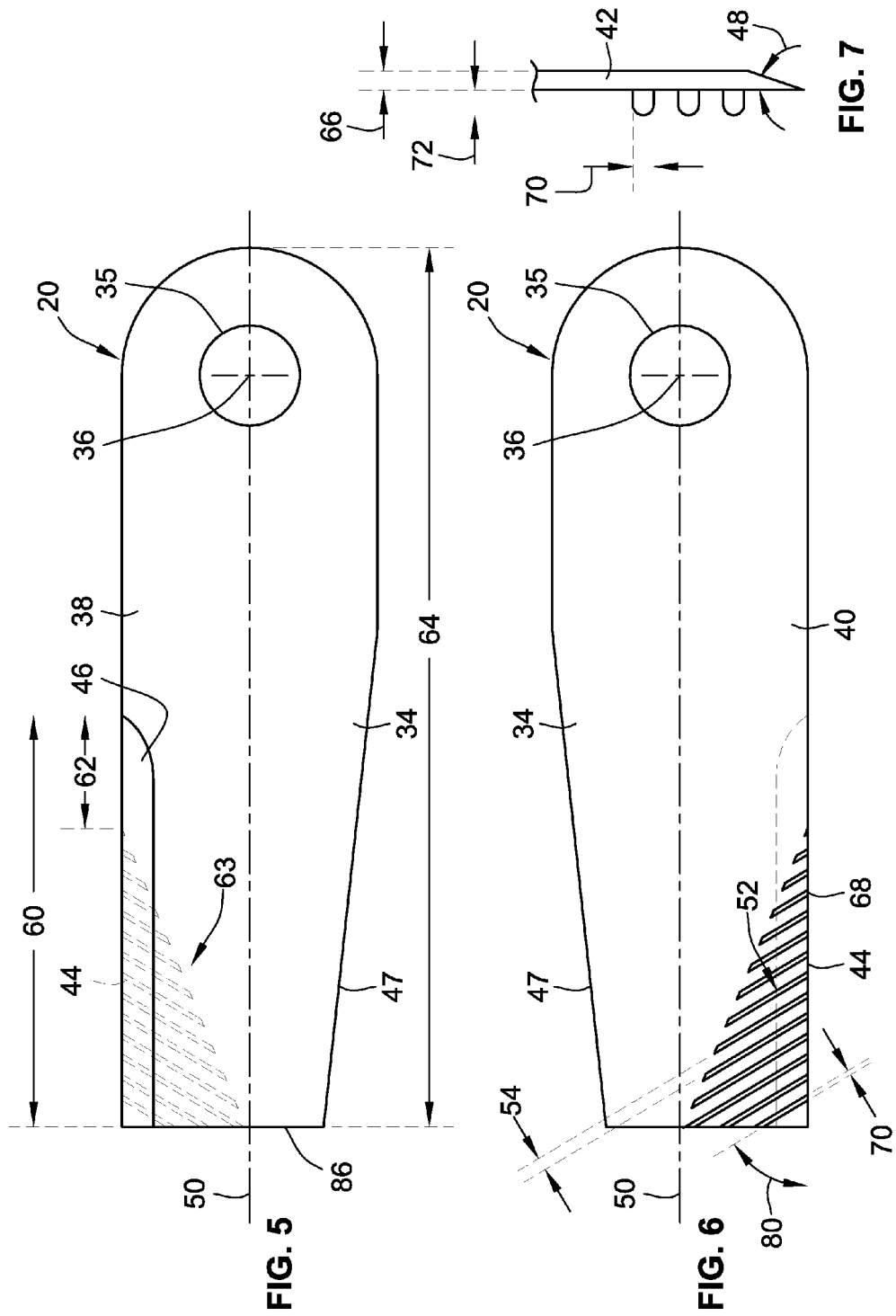

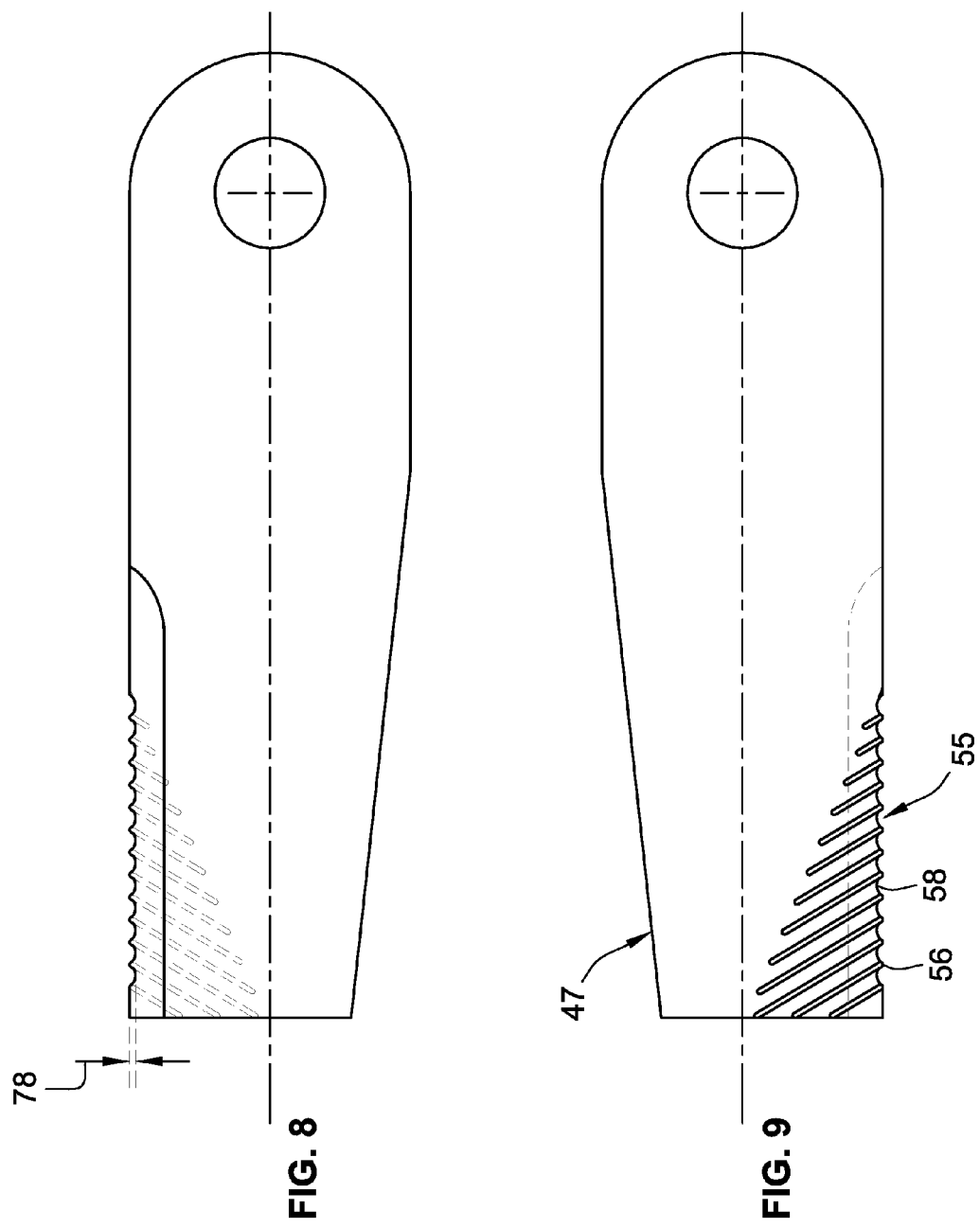

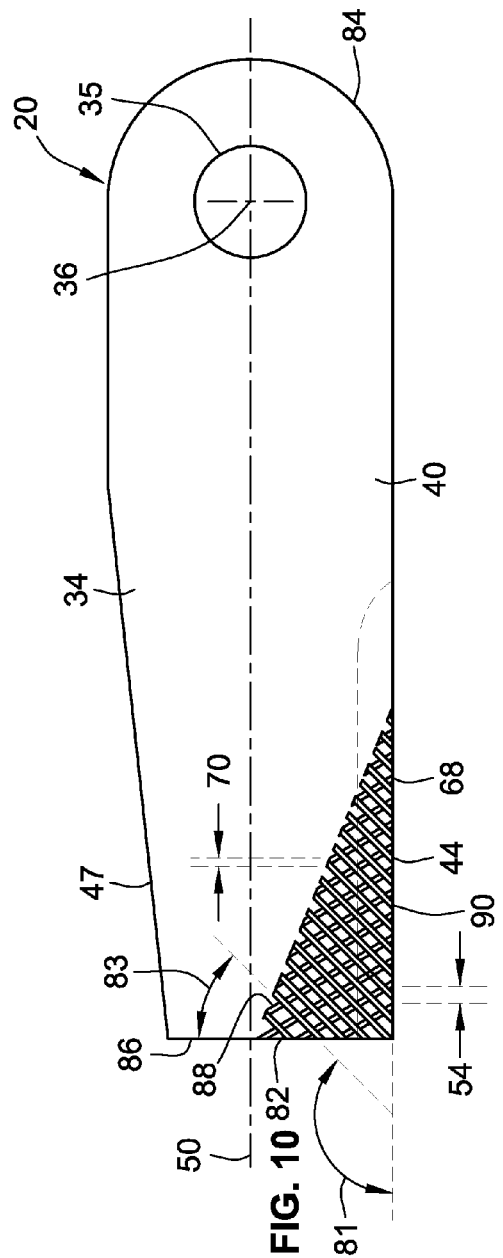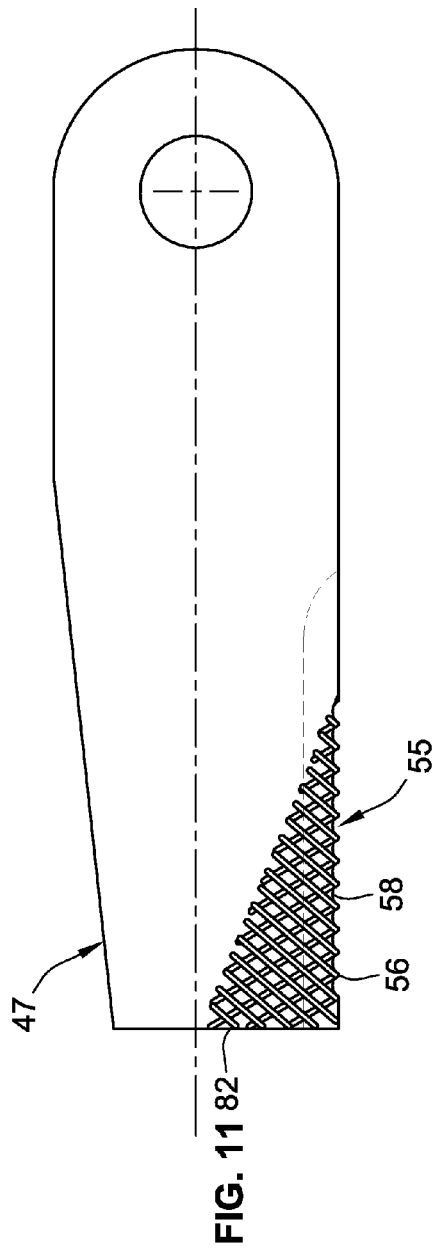

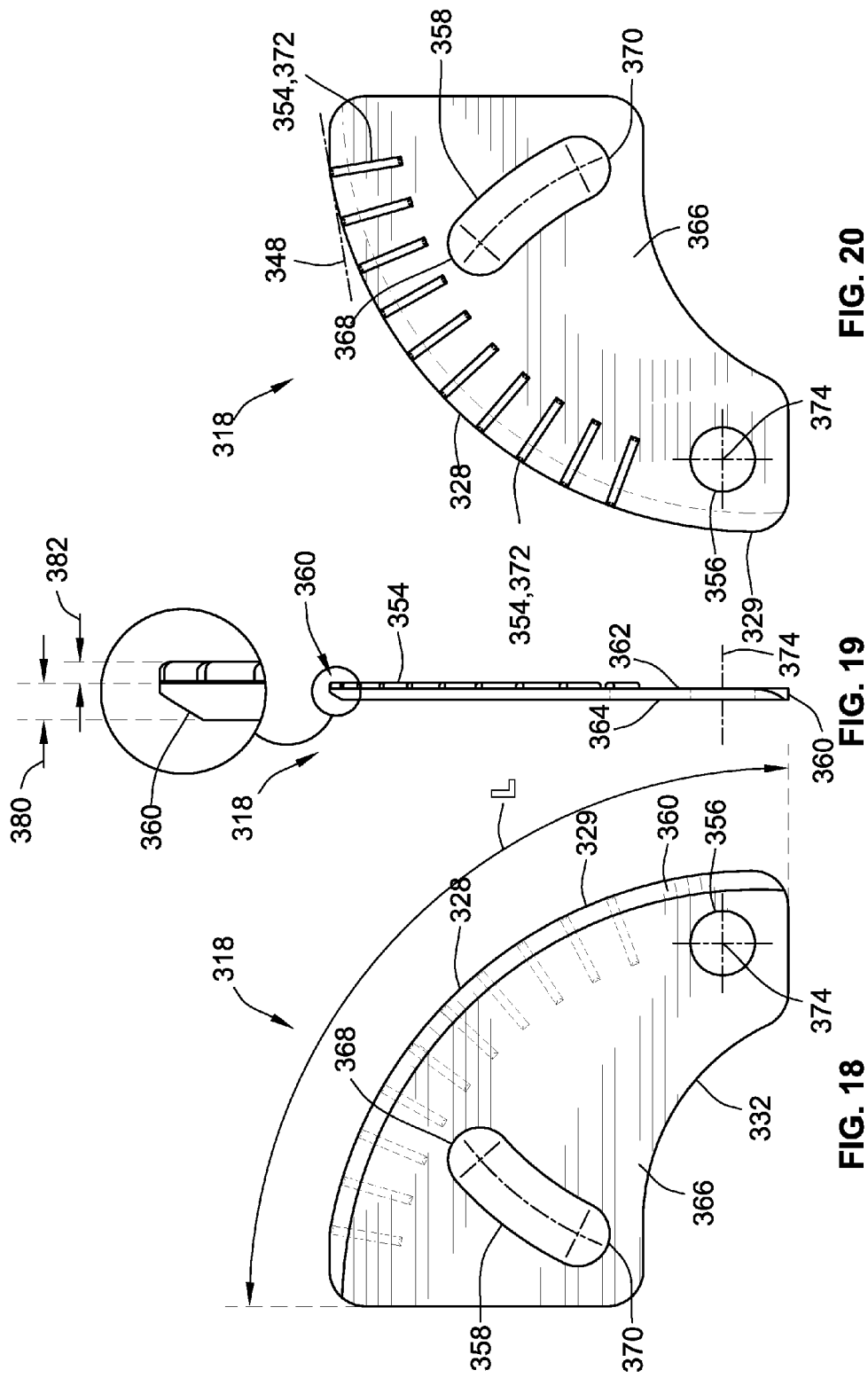

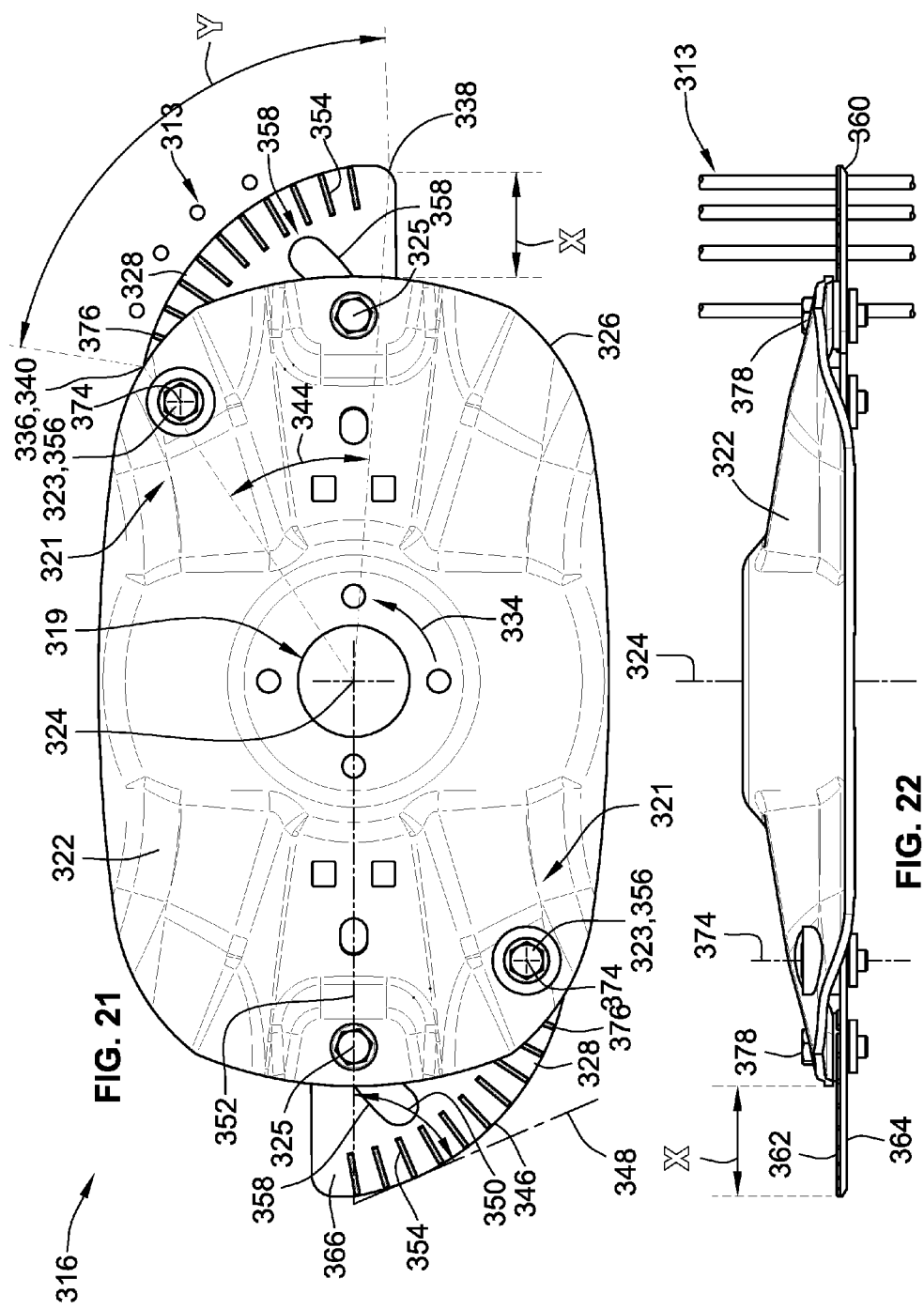

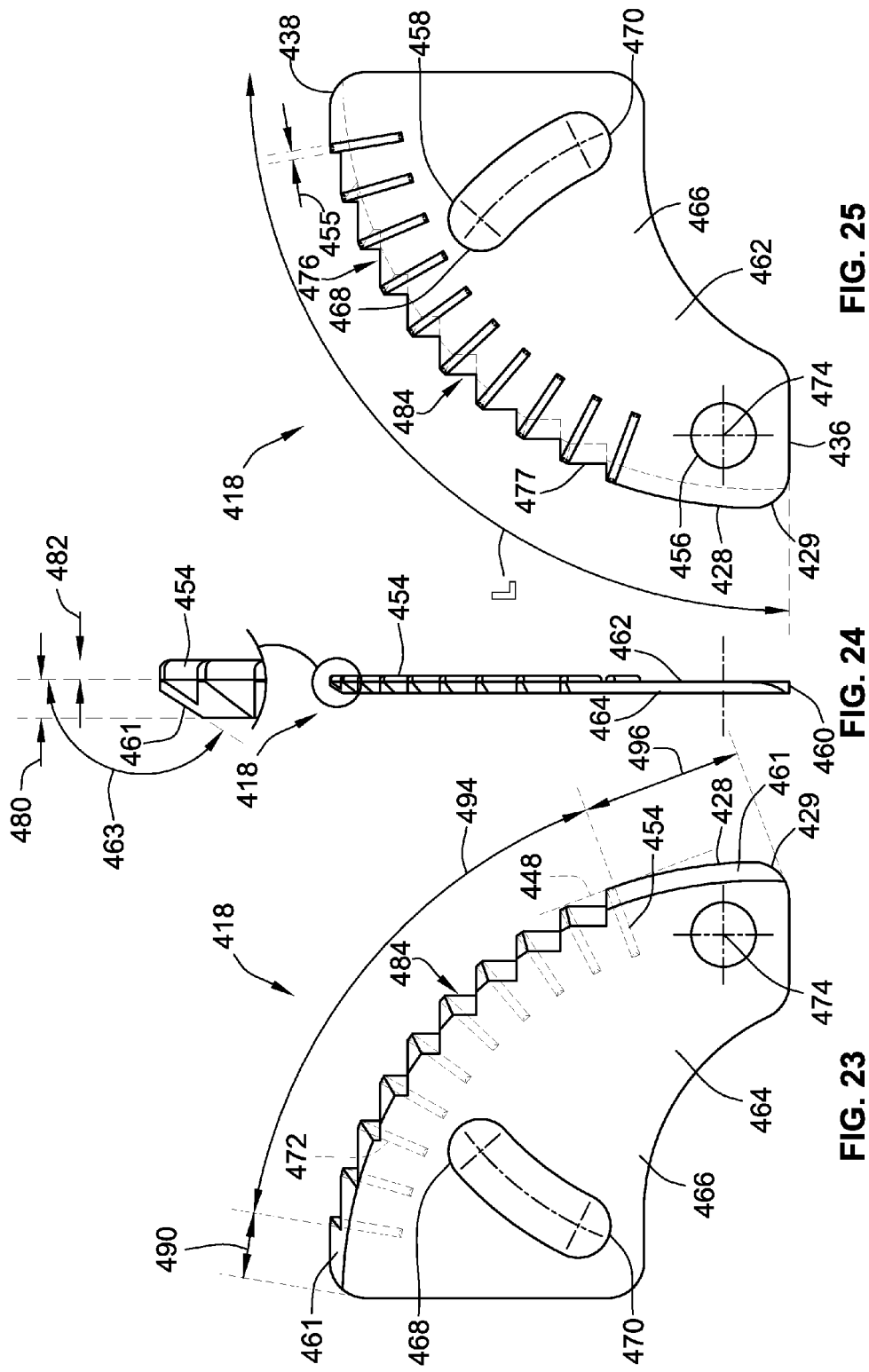

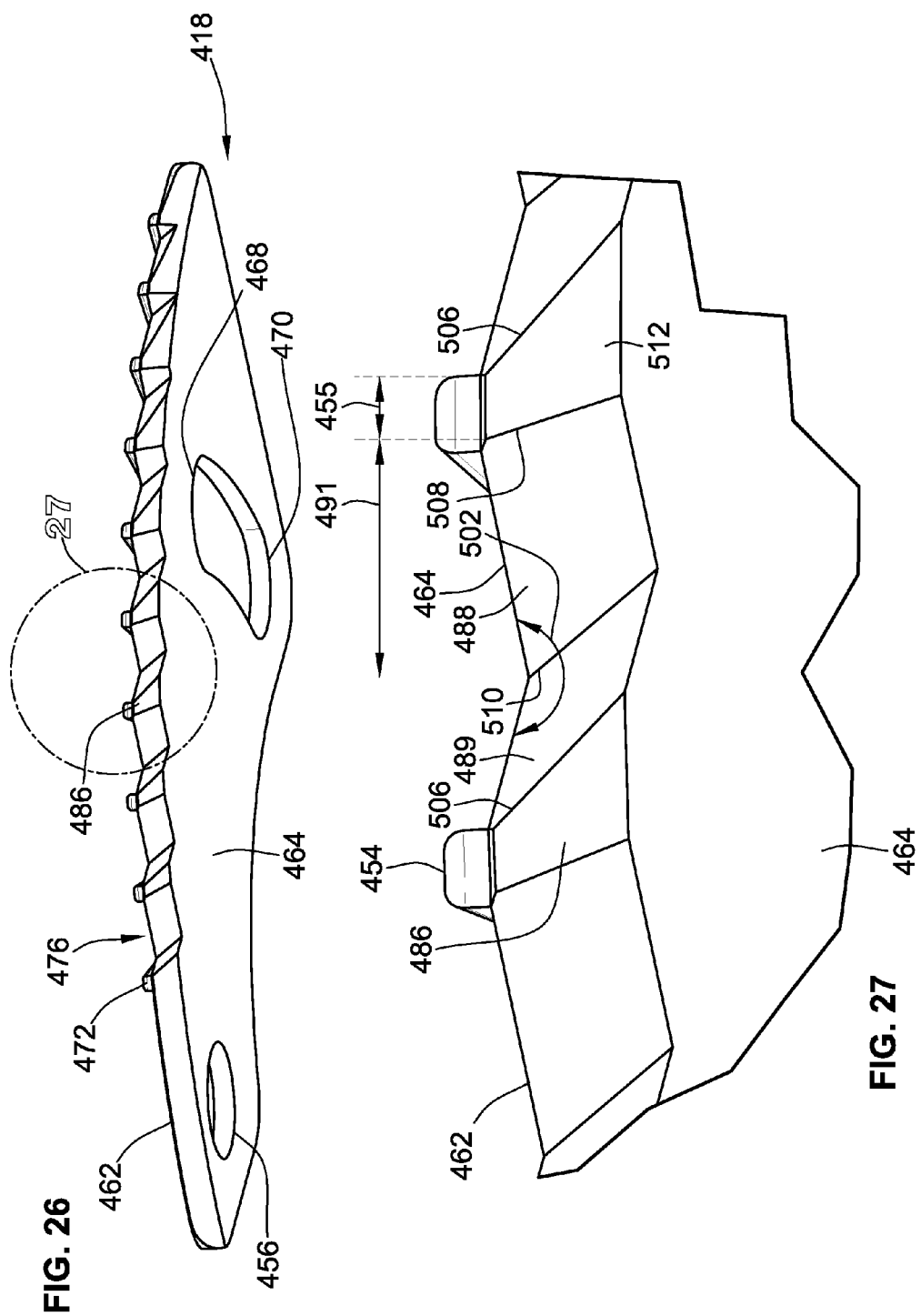

CUTTING BLADE WITH HARDENED REGIONS

This patent application is a continuation of co-pending U.S. patent application Ser. No. 14/708,649, filed May 11, 2015, which claims the benefit of U.S. Provisional Patent Application No. 61/991,938, filed May 12, 2014, U.S. Provisional Patent Application No. 62/036,490, filed Aug. 12, 2014, and U.S. Provisional Patent Application No. 62/081,897, filed Nov. 19, 2014, and is a continuation in part of co-pending U.S. patent application Ser. No. 14/708,466, filed May 11, 2015, which claims the benefit of U.S. Provisional Patent Application No. 61/991,938, filed May 12, 2014, and U.S. Provisional Patent Application No. 62/036,490, filed Aug. 12, 2014, the entire teachings and disclosure of which are incorporated herein by reference thereto.

FIELD OF THE INVENTION

This invention generally relates to blades.

BACKGROUND OF THE INVENTION

Disc mowing machines are utilized to cut a crop while moving through a stand of the crop. Examples of such machines are shown for example in U.S. Patent Application Publication No. 2013/0111863. The disc mowing machines may be either self-propelled or pulled, for example, by a tractor.

As disclosed in the '863 publication, current disc mowing machines cut agricultural material using a severing blade that is rectangular in shape with a mounting hole toward one end of the blade. The severing blade is rotatably mounted to a plurality of rotating mower discs. The portion of the blade away from the mounting portion has a beveled edge and this portion of the blade impacts and cuts the crop as the disc rotates.

There are problems associated with current disc mower machines. They require a large amount of power to rotate their discs and drive the rectangular blades through the crops. The cutting of the crop itself is not a large percentage of the total power required, but any reduction in power used is beneficial. Ideally, if the crop can be cut more efficiently, the amount of fuel used can be reduced.

The rectangular blades of current designs become dull almost immediately upon use and impact with the crop. The blades wear out beyond usefulness in a fairly short time span depending on field conditions. Such wear leads to increased expenses and increase time for maintenance to repair and or replace the worn blades.

Efforts to improve these blades have been attempted by providing a serrated cutting edge with hardened laser clad beads forming the serrated cutting edge. For example, this type of solution has been attempted as described in U.S. Pat. No. 7,677,843, the entire teachings of which are incorporated herein by reference as the materials and techniques disclosed there can also be applied to the present invention.

However, various drawbacks and inefficiencies exist in the approach of the '843 patent, as will become apparent with the various inventive aspects of the present invention and disclosure and claims herein that so distinguish.

BRIEF SUMMARY OF THE INVENTION

In one aspect, the invention provides a cutting blade for vegetation that includes a cutting blade body that may be comprised of a first base material. The cutting blade body has top and bottom surfaces, an outer surface extending around the cutting blade body vertically between the top and bottom surfaces, and a cutting edge formed along the outer surface. The cutting blade body also has a plurality of clad beads extending along one of the top and bottom surfaces. The clad beads extend transversely away from the cutting edge and the cutting edge is non-serrated.

In another aspect, the invention provides a cutting blade for a mower disc body. The blade may include a cutting blade body that comprises a base material of a first hardness. The blade body may have opposed top and bottom surfaces and an outer surface that extends around the blade body vertically between the top and bottom surfaces. The blade may include a cutting blade body mounting aperture that extends through the top and bottom surfaces. The cutting blade body may further include a cutting face that extends obliquely between the top surface toward the bottom surface and a cutting edge that is formed at a leading edge of the cutting face. One of the top and bottom surfaces of the cutting blade body may include a plurality of hardened beads that are spaced apart and of a second hardness greater than the first hardness. The hardened beads may be arranged at or adjacent to the cutting edge and lateral gaps may be formed of the base material between adjacent hardened beads.

In still another aspect, the invention comprises a method for providing a cutting blade with a cutting blade body. The cutting blade body may have a top surface and a bottom surface. The cutting blade body may be formed of a base material and have a cutting edge formed into the cutting blade body. The cutting edge may extend along an outer edge of the cutting blade body. The method further comprises cladding a plurality of beads that are laterally spaced apart along one of the top and bottom surfaces so that the beads extend from the cutting edge towards a central longitudinal axis of the cutting blade body while leaving exposed regions of the base material between adjacent laterally spaced beads.

In an embodiment, the cutting edge along a ground face is formed by the first base material in an unused condition. The cutting blade is configured so that the plurality of clad beads are at the cutting edge in the unused condition are sufficiently adjacent to the cutting edge such that the plurality of clad beads become part of the cutting edge over time during use.

In an embodiment, the first base material may be of a first hardness having a first wear rate with use, and wherein the plurality of clad beads may be of a second material of a second hardness having a second wear rate with use.

In an embodiment, the first hardness may be less than the second hardness and the first wear rate of the first material may be greater than the second wear rate of the second material. The plurality of clad beads may be laser clad beads deposited on one of the top and bottom surfaces.

In an embodiment, each one of the plurality of clad beads may be spaced laterally from another one of the plurality of clad beads with uncladded regions therebetween such that the base material between the clad beads of the second material wears faster during use and results in a wave pattern in the cutting edge.

In an embodiment, no part of the clad beads, other than flash, extends forward of the cutting edge in the unused condition. A leading end of the clad beads may be between 0 mm and 5 mm of the cutting edge.

In an embodiment, the cutting blade includes a clad bead application region. The clad beads may occupy 20% to 80% of the clad bead application region. Free regions of first base material exposed between the clad beads may include 20% to 80% of the clad bead application region.

In an embodiment, the space between each one of the plurality of clad beads adjacent to the cutting edge is between 0.5 mm and 20 mm to control the depth of the wave pattern during wear.

In an embodiment, each one of the plurality of clad beads may extend transversely away from the cutting edge towards a central longitudinal axis of the cutting blade body at an angle in the range of 45° to 55° relative to the cutting edge.

In an embodiment, the cutting edge is configured to form a wave pattern only after use.

In an embodiment, the plurality of hardened beads may be deposited along the cutting edge and thereby form part of the cutting edge of the cutting face, are not machined prior to use and may not extend beyond an outermost perimeter of the blade body prior to use, other than flash. The plurality of hardened beads may extend beyond an outermost periphery of the blade body to form part of a wave pattern along the cutting edge only after use.

In an embodiment, the cutting edge is composed of discrete cutting edge segments. Each cutting edge segment may be comprised of at least one unsharpened hardened bead and a length of base material.

In an embodiment, at least 20 percent of the cutting edge may be comprised of the base material before and after use.

In an embodiment, a mower disc assembly is provided for. The mower disc assembly comprises at least two cutter blades. The cutter blade includes a cutting blade body that may be comprised of a first base material. The cutting blade body has top and bottom surfaces, an outer surface extending around the cutting blade body vertically between the top and bottom surfaces, and a cutting edge formed along the outer surface. The cutting blade body also has a plurality of clad beads extending along one of the top and bottom surfaces. The clad beads extend transversely away from the cutting edge and the cutting edge is non-serrated. The mower disc assembly may comprise a mower disc body adapted to rotate about a central axis of the mower disc body.

Each cutting blade may be mounted to the disc mower body in space relation. Each cutting blade may have a leading face and a trailing face. The cutting edge may be along the leading face. The plurality of clad beads may extend from the leading face at or adjacent the cutting edge towards the trailing face.

In an embodiment, the step of cladding may further comprise the step of depositing each bead of cladding transversely away from the cutting edge towards a cutting blade body central longitudinal axis at an angle in the range of 45° to 55° relative to the cutting edge.

In an embodiment, the step of providing the cutting blade with the cutting blade body may include providing the top and bottom surfaces in opposed space relation and a cutting face that extends from the cutting edge towards a one of the top and bottom surfaces.

In an embodiment, the step of cladding is done only after the cutting face is formed.

In an embodiment, the step of cladding is done by laser cladding.

In an embodiment, the method includes providing the base material that may be of a first hardness and cladding that may be of a second material and of a second hardness. The first hardness may be less than the second hardness such that during use the base material wears faster than the second material so as to form a wave pattern in the cutting edge.

In an embodiment, the plurality of clad beads include a first plurality of clad beads and a second plurality of clad beads. The first plurality of clad beads may be aligned differently than the second plurality of clad beads.

In an embodiment, the first and second plurality of clad beads overlap in a crisscross pattern.

In another aspect, the invention provides a blade for a mower disc body that defines a central axis of rotation. The blade includes a blade body of a first hardness. The blade body has opposed top and bottom surfaces and includes an outer surface that extends around the blade body vertically between the top and bottom surfaces. The blade body includes first and second apertures or retainer structures in spaced apart relation. A cutting edge extends along an outer surface of the blade.

In another aspect, the invention provides a blade for a mower disc body. The blade comprises a blade body of a first hardness. The blade body has opposed top and bottom surfaces and comprises an outer surface extending around the blade body vertically between the top and bottom surfaces. The blade further comprises a first and a second blade body retainer. A cutting edge extends along the outer surface of the blade. The top surface comprises a plurality of hardened beads spaced apart and of a second hardness greater than the first hardness. The hardened beads are arranged adjacent to the cutting edge and extend toward the outer surface.

In yet another aspect, the invention provides at least one blade for a mower disc body. The mower disc body is adapted to rotate about a central axis. The mower disc body includes an outer periphery. The at least one blade includes a blade body. The at least one blade is configured such that when it is mounted to the disc mower body the blade body extends radially outward from the outer periphery an X radial distance. The at least one blade has a cutting edge that extends along a length of a Y distance from a leading end to a trailing end. The Y distance is more than 1.5 times as great as the X radial distance.

In still another aspect, the invention provides a mower disc assembly. A mower disc body is adapted to rotate about a central axis of the mower disc body. The mower disc body includes an outer periphery. Two blades are mounted to the disc mower body in diagonally opposed space relation. Each of the blades comprises a hinge retainer that allows articulating movement of the blade and a slide retainer. The slide retainer is disposed at a location trailing the first hinge. Each of the blades has movement limited by the slide retainer between a first stop and a second stop.

In still yet another aspect, the invention provides a mowing machine for slicing crops. The mowing machine includes a blade for a mower disc body that defines a central axis of rotation. The blade includes a blade body of a first hardness. The blade body has opposed top and bottom surfaces and includes an outer surface that extends around the blade body vertically between the top and bottom surfaces. The blade body includes first and second apertures or retainer structures in spaced apart relation. A cutting edge extends along an outer surface of the blade.

In an embodiment the cutting edge extends from a leading location to a trailing location relative to the central axis and predetermined rotational movement for the blade. The leading location and the trailing location are separated by an angular distance of at least 120 degrees. In a more preferred embodiment the angular distance may be at least 30 degrees with the leading location and the trailing location separated between 5 and 25 centimeters.

In another embodiment the first and second apertures or retainer structures comprise a mounting aperture or other hinge retainer structure that defines a blade body axis of rotation for pivoting movement. The blade body defines an elongated slot or other slide retainer structure that defines a first stop and second stop adapted to limit pivoting movement of the blade body.

In an embodiment the Y distance is more than 1.5 times as great as the X radial distance. The cutting edge extends a distance of between 5 and 25 centimeters.

In an embodiment the cutting edge includes a curved portion that defines a tangent that defines an acute angle greater than 45 degrees with a radial extension extending from the central axis of rotation.

In an embodiment the cutting edge may be convex and faces away from the mower disc body.

In an embodiment the top surface of the blade body comprises a plurality of hardened beads spaced apart and of a second hardness greater than the first hardness. The hardened beads comprise laser clad material deposited along an extension radially inward and perpendicular or within 45 degrees of perpendicular to a tangent along the convex cutting edge.

In one embodiment the blade body may include a tapered cutting face formed into the bottom side and intersecting the cutting edge. The tapered cutting face may be sandwiched between the top surface and a bottom surface of the blade body and extend radially inward from the top surface to the bottom surface.

In an embodiment the blade includes a mounting structure adapted to mount the blade to the mower disc body.

In an embodiment the cutting edge may be formed along the top surface.

In an embodiment the blade body comprises a sheet steel formed component having a material thickness that is substantially uniform.

In an embodiment the hardened beads are 10 to 30% the thickness of the material thickness. The first hardness is between HV 400 and 650 in the Vickers scale hardness. The hardened beads comprise at least one of the materials comprising: tungsten carbide, chrome carbide, iron carbide, ceramic, and other material having a Vickers scale hardness between HV 700 to 1400.

In an embodiment the blade body comprises a mounting aperture or other hinge retainer that defines a blade body axis of rotation for pivoting movement. The blade body defines an elongated slot or other slide retainer that defines a first stop and second stop that limits the pivoting movement of the blade body.

In an embodiment the cutting edge extends along a trailing path from a leading location to a trailing location relative a predetermined axis of rotation defined by the mower disc body when the blade is mounted to the mower disc body. The blade body may include a leading hardened bead and a plurality trailing hardened beads. The trailing hardened beads may be located in a series trailing the leading location.

In preferred embodiment the Y distance is more than 2 times as great as the X radial distance.

In a more preferred embodiment the Y distance is more than 2.5 times as great as the X radial distance.

In an embodiment the mower body may rotate in a first direction about the central axis of rotation and the blade body may simultaneously be able to rotate about a first hinge axis of rotation in a second and opposite direction of the first direction.

In an embodiment the mower disc body may include a mounting location for a drive unit. The mounting location may define the center axis of rotation of the mower disc body. The two blade mounting portions are in opposed space relation. Each blade mounting portion may include a first and second blade mounting location.

In an embodiment the first and second blade mounting locations of the mower disc body may be apertures. The hinge retainer of the mower disc blade may be an aperture. The slide retainer of the mower disc blade may be a slotted aperture. Each of the blades may be mounted to the mower disc body with fasteners. One the fastener may be inserted through the first aperture of the blade mounting location and the hinge retainer aperture. The other of the fasteners may be inserted through the second blade mounting location aperture and the slotted aperture.

In an embodiment the mowing machine may include a drive unit. A rotary cutter bar may be operably coupled to the drive unit such that the drive unit drives the rotary cutter bar. At least one mower disc assembly is operably connected to the rotary cutting bar. The at least one mower disc assembly is configured to rotate about a central axis of the mower disc assembly.

In still another aspect, the invention provides a method for slicing crops. The method comprises providing a machine to move through the crop. The machine comprises at least one mower disc assembly configured to rotate about a central axis of a mower disc body of the mower disc assembly.

In an embodiment, the method may include providing at least two blades for mounting to a mower disc body. Each blade may include a blade body of a first hardness. The blade body has opposed top and bottom surfaces and comprises an outer surface extending around the blade body vertically between the top and bottom surfaces. The blade body comprises first and second apertures or retainer structures in spaced apart relation and a cutting edge extending along an outer surface of the blade.

In an embodiment, the method may include mounting the at least two blades to the mower disc body in opposed space relation.

In certain embodiments, the method step for providing the at least two blades further includes the step of depositing a plurality of hardened beads along the top surface of each blade. The hardened beads may be spaced apart and of a second hardness greater than the first hardness. Each blade when mounted to the mower disc body may extend radially outward from a mower body outer periphery an X radial distance. The cutting edge of each blade extends along a length of a Y distance from a leading end of each blade to a trailing end of each blade. The Y distance is more than 1.5 times as great as the X radial distance.

In yet another embodiment, the cutting edge may include a leading edge portion, a center edge portion and a trailing edge portion. The center edge portion may include graduated cutting teeth.

Each graduated cutting tooth may include a tip face, a relief face and a beveled cutting face arranged to create a step in the cutting edge and thereby make the cutting edge discontinuous along the outer surface. The relief face may extend transverse and inward away from an outermost periphery of the cutting edge to create the step. The tip face may be located at the outermost periphery of the cutting edge. The beveled cutting face may extend transversely between the tip face and the relief face. Each relief face may extend from either the leading edge portion or one tip face of an upstream graduated cutting tooth.

The graduating cutting teeth may be located in the center edge portion, and the beveled cutting edges get shorter and the relief faces get longer the farther the graduated cutting teeth are from the leading portion. The graduated cutting teeth are sharpened to have a segmented cutting surface.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 5 is a top view of a blade employed in the mower disc assembly of FIG. 4;

FIG. 6 is a bottom view of the blade of FIG. 5;

FIG. 7 is a side view of the blade of FIG. 5;

FIG. 8 is a top view of the blade of FIG. 5 after use;

FIG. 9 is a bottom view of the blade of FIG. 5 after use;

FIG. 10 is a bottom view of an embodiment of a blade employed in the mower disc assembly of FIG. 4;

FIG. 11 is a bottom view of the blade of FIG. 10 after use;

FIG. 18 is a bottom view of a the blade employed in the mower disc assembly of FIG. 17;

FIG. 19 is a side view of the blade of FIG. 18;

FIG. 20 is a top view of the blade of FIG. 18;

FIG. 21 is a top view of the mower disc assembly of FIG. 17;

FIG. 22 is a side elevation view of the mower disc assembly of FIG. 17;

FIG. 23 is a bottom view of a blade employed in the mower disc assembly of FIG. 17;

FIG. 24 is a side view of the blade of FIG. 23;

FIG. 25 is a top view of the blade of FIG. 23;

FIG. 26 is a perspective view of the graduated cutting teeth of FIG. 23; and

FIG. 27 is an exploded partial perspective view of the cutting teeth of FIG. 26.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
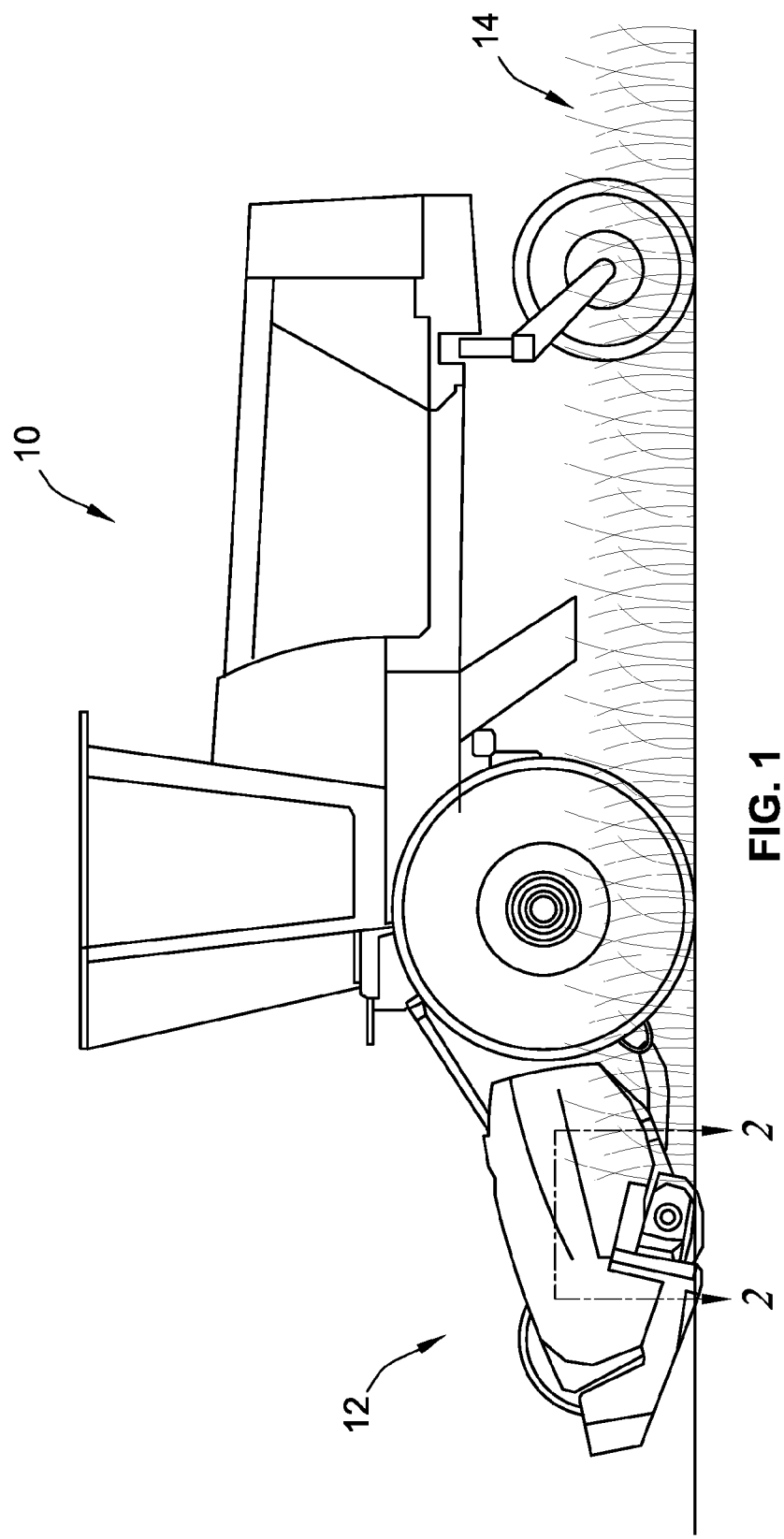
FIG. 1 is an illustration of a tractor manipulating a mowing machine through a crop.

FIG. 1 illustrates a tractor 10 operating a mowing machine 12 through a stand of crop 14. The mowing machine 12 may either be self-propelled or as shown here manipulated and powered by the tractor 10.

Figure 2:
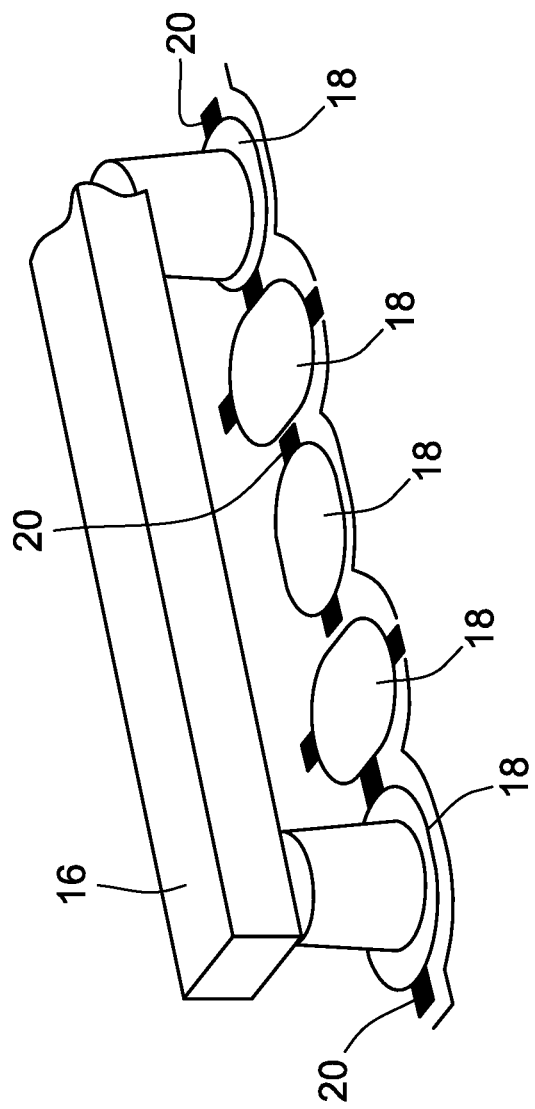
FIG. 2 is a partly schematic isometric illustration of a disc mower cutter bar including a plurality of discs holding a plurality of mower blades.

FIG. 2 illustrates a mower disc cutter bar 16 that forms a part of the mowing machine 12 shown in FIG. 1. The mower disc cutter bar 16 supports a plurality of mower disc assemblies 18, which in turn support a plurality of mower blades 20 (also known as cutter blades and/or knives). The blades 20 described herein may be used in various applications such as cutting vegetation including lawn and turf applications, cutting crops, and various other agricultural operations for which blade 20 is well suited. Accordingly, the aforementioned uses for blade 20 are intended as non-limiting examples.

Figure 3:
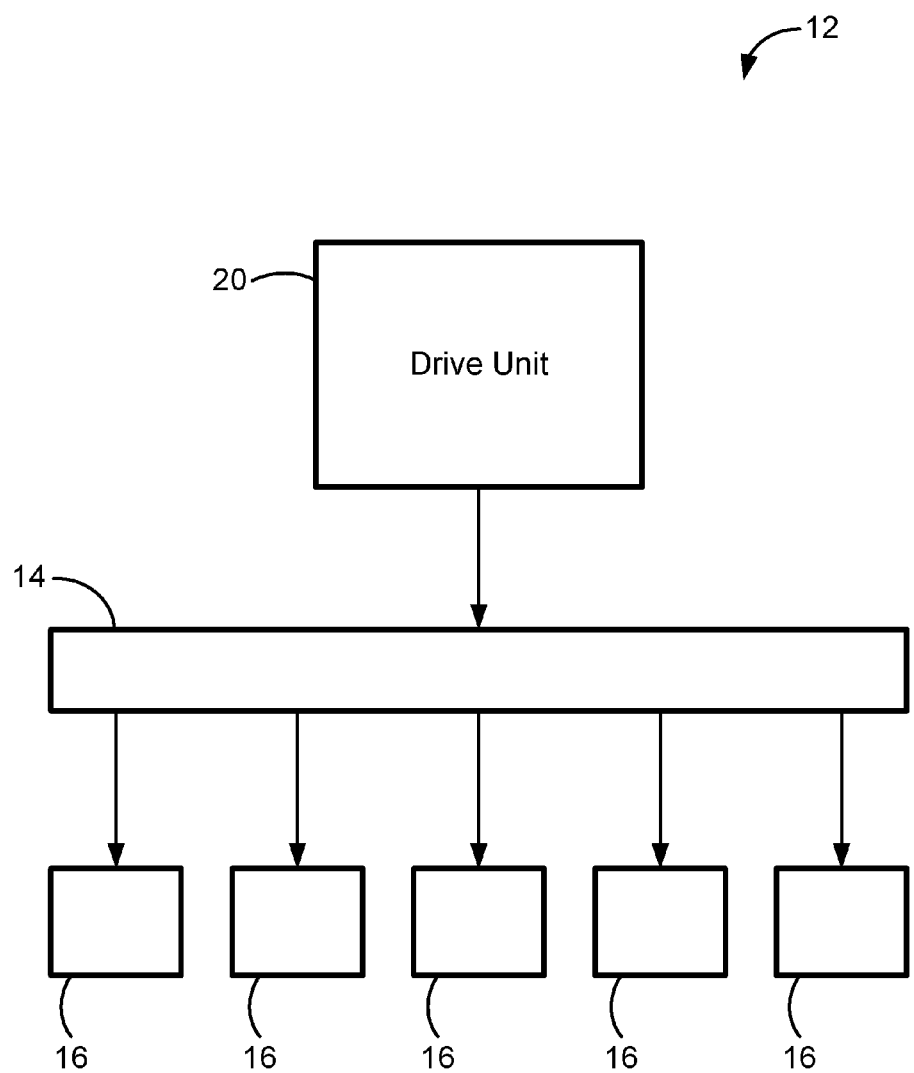
FIG. 3 is a schematic view of a mowing machine.

FIG. 3 illustrates a schematic view of a mowing machine 12. The mowing machine 12 includes a drive unit 22 for driving a rotary cutter bar 16. The rotary cutter bar 16 includes a plurality of mower disc assemblies 18, each containing a plurality of mower blades 20 (see FIG. 2). While the mowing machine 12 is illustrated as including a plurality of mower disc assemblies 18, it is contemplated that as few as one mower disc assembly 18 could be employed in certain applications.

Figure 4:
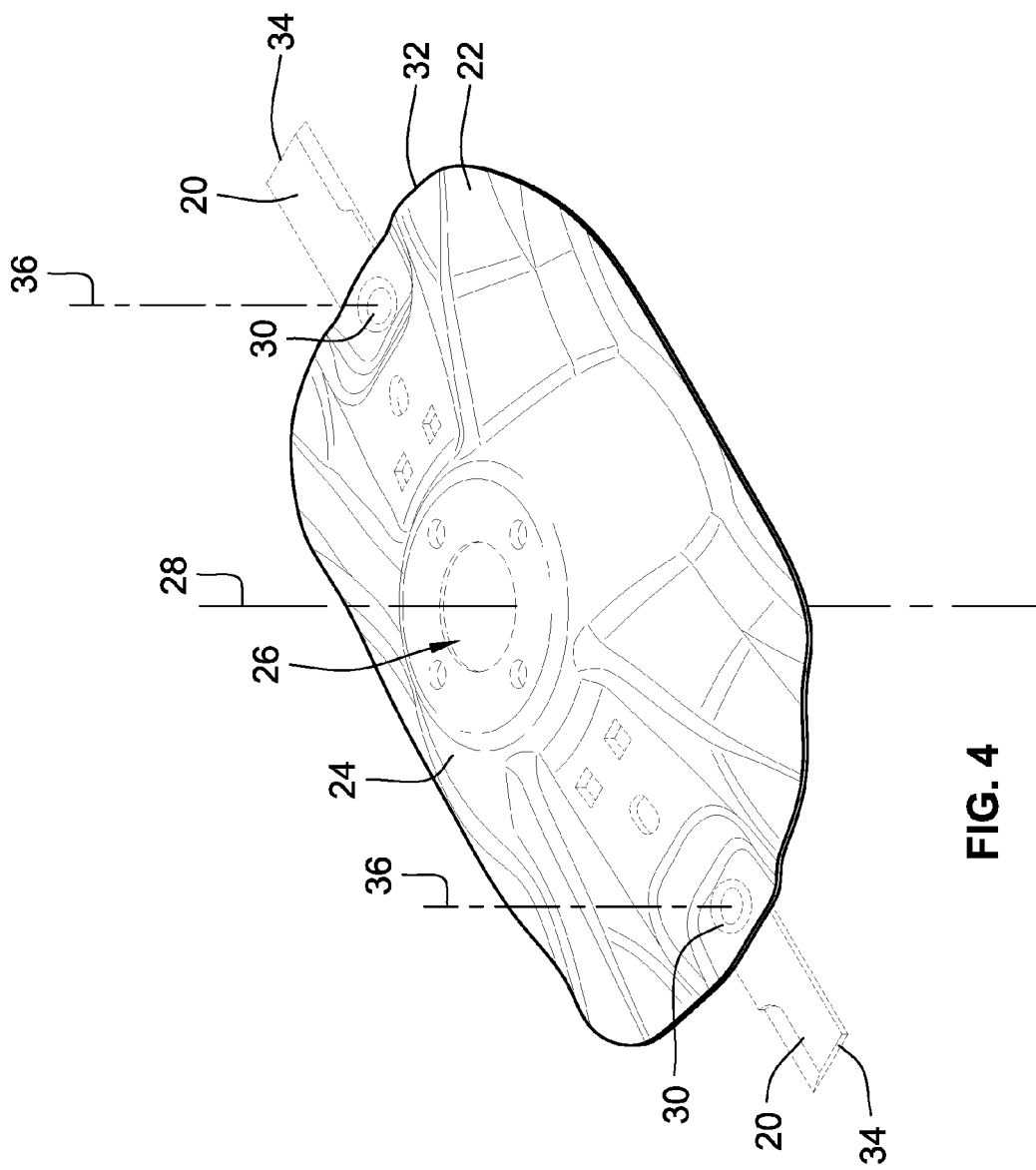
FIG. 4 is an isometric view of a mower disc assembly.

FIG. 4 illustrates an isometric view of a mower disc assembly 18 including disc mower blades 20.

The mower disc assembly 18 includes a mower disc body 24. The mower disc body 24 defines a mounting aperture 26 which attaches to the rotary cutter bar 16 (see FIGS. 2-3) that is in turn driven by the drive unit 22. The drive unit 22 causes the mower disc assembly 18 to rotate about a central axis of rotation 28 that is defined by the mower disc body 24. The mower disc body 24 may include two blade mounting locations 30. In the embodiment shown in FIG. 4 the blade mounting locations 30 are apertures or boss structures through which fasteners (not illustrated) may be inserted to mount blades 20. While two blade mounting locations 30 are illustrated it can be readily appreciated that only a single blade mounting location 30 may be provided on the mower disc body 24 or more than two blade mounting locations 30 may be provide so long as the blade/blades 20 when mounted are balanced during the rotation of the mower disc body 24.

The blades 20 are mounted transversely to the mower disc body 24 central axis of rotation 28. As illustrated, the two blade mounting locations 30 are positioned toward a bottom of the mower disc body 24 so as to balance the blades 20 such that during rotation, the blades 20 will extend outwards beyond a mower disc body 24 outer most periphery 30 under centrifugal force. Each blade 20 comprises a blade body 34 that pivots about a blade body 34 axis of rotation 36. It is not the intent to limit the mounting location structures to apertures or bosses with bolts. Any suitable retainer structure to mount the blade 20 to the mower body 24 may be utilized provided the blade 20 may pivot outwards to extend beyond the mower body 24 outer most periphery 32 under a centrifugal force generated by the mower disc body 24 in rotation.

Turning now to FIGS. 5, 6 and 7, respectively, a top view, bottom view and side view of a blade 20 for a mower disc body 24 are shown. The blade 20 may be stamped formed from sheet steel to include a blade body 34 of a first hardness between HV 400 and 650 on Vickers scale. The blade body 34 has opposed top 38 and bottom 40 surfaces. An outer surface 42 extends around the blade body 34 vertically between the top 38 and bottom 40 surfaces. The blade body 34 includes a mounting aperture 35 that defines the blade body 34 axis of rotation 36. The mounting aperture 35 extends through the top 38 and bottom 40 surfaces.

Blade 20 is depicted in FIG. 4, and describes herein with respect to FIGS. 5, 6, and 7 as having top and bottom surfaces because of the blade's orientation. However, this blade 20 orientation is not intended to be a limiting example of the orientation of blade 20. For example, it can be readily appreciate the blade could be oriented vertically for use in various operations, for example chopping, in which case the blade 20 would be orientated vertically and the top 38 and bottom 40 surfaces would be understood to be opposed surfaces of said vertical blade 20.

A cutting edge 44 extends along the outer surface 42 the blade 20. The cutting edge 44 may extend a length of typically between 10 and 250 millimeters and more preferably between 50 and 100 millimeters. It is not the intent to limit construction of the blade body 34 only to sheet steel. Comparable materials such as cast or machined steel blanks may be utilized to form the blade body 34.

A cutting face 48 is machined, for example by grinding, into the outer surface 42 prior to depositing a plurality of hardened beads 46 onto one of the top 38 or bottom surfaces 40 of the blade 20. The cutting face 46 extends obliquely between the top 38 and bottom surfaces 40 of the blade 20 and comprises the cutting edge 44 where the cutting face 46 intersects either the top 38 or bottom 40 surface depending on the embodiment. For example, in the embodiment, as illustrated here, the cutting edge 44 is formed at the intersection of the bottom surface 40 with the cutting face 46. Moreover, the cutting face 46 extends from the cutting edge 44 along the bottom surface 40 obliquely towards the top surface 38 such that an acute angle 48 is defined between the bottom surface 40 and cutting face 46 of between 45 and 20 degrees. In other words, relative to a blade body central longitudinal axis 50, the cutting face 46 extends radially inward from the bottom surface 40 of the blade 20 towards the top surface 38 of the blade 20.

As the mower disc assembly 18 rotates and is brought into contact with a crop 14 or foliage to be mowed, the cutter blades 20 will impact the crop or foliage 14 at the cutting edge 44 and along the cutting face 46, that is a leading face and thereby cut an upper portion of the crop 14 or foliage from its root system. It is readily understood then that the blade 20 in motion also has a trailing face 47 in opposed space relation to the leading face (e.g. at cutting face 46).

In the embodiment illustrated, the hardened beads 52 are spaced apart from one another and of a second hardness greater than the first hardness. The plurality of hardened beads 52 is deposited on the bottom surface 40, preferably only after the cutting face 46 has either been ground into the blade body 34. In other embodiments the hardened beads 52 may be deposited along the top surface 38. However, here, in the embodiment illustrated the hardened beads 52 are deposited on the bottom surface 40 of the blade 20.

Each one of the hardened beads 52 may be deposited via laser cladding. The laser deposits each of the hardened beads 52 on the bottom surface 40 such that the length of each bead extends from the cutting edge 44 transversely towards the central longitudinal axis of 50 of the blade body 34 at angle 80 of between 45 to 55 degrees relative to the cutting edge. The laser clad beads 52 are space apart from one another so as to define a width 54 at the cutting edge 44.

Accordingly, the cutting edge 44 preferably is defined by exposed discrete segments of the base material of the blade body 34 of a first hardness between each laser clad bead deposit 52 of a second hardness. The laser clad beads are deposited such that an end 68 the laser clad beads 52 by design is at the cutting edge 48 except perhaps for an inconsequential amount that may inadvertently extend slightly past the intended line of demarcation (e.g. due to manufacturing clad process inaccuracies or tolerance issues), that is the cutting edge 44. Such inconsequential and unintended amount of cladding 52 over the cutting edge 44 may be referred to as flash.

Further, it may be that during deposit of the laser cladding 52 intended to meet the cutting edge 44, the end of the laser cladding may inadvertently fall slightly short of the cutting edge 44. This unintended consequence of laser cladding 52 adjacent to the cutting edge 44 still permits the desired configuration, that is a cutting edge 44 that will be comprised of ground base material of a first hardness that wears at a faster rate than the laser clad beads 52 of a second hardness so as to provide for a wave pattern 55 in the cutting edge 44 with use. Thus, preferably, the laser cladding 52 ranges between 0 and 5 mm from edge and more preferably between 0 to 0.5 mm In other words, the wear rate during use, that is the amount of material worn away by use over time, is such that the amount of base material of the softer hardness that is worn away while cutting crop 14 is faster than the wear rate of the laser clad beads 52 of the harder hardness during use. Because the wear rates differ this allows for a wave pattern effect 55 at the cutting edge 44 with cutting teeth created by individual clad beads that may not be sharpened or ground. (FIGS. 8 and 9) This effect provides the benefit of allowing blade 20 to self-sharpen and/or create a wave pattern 55 of spaced cutting teeth on the cutting edge 44.

Accordingly, the laser cladding 52 is deposited on or adjacent but not beyond the cutting edge 44, save for unintended and inconsequentially small amounts. Thus, whether the cladding is at or adjacent the cutting edge 44, the benefit of a longer life cutting edge 44 is provided thereby. Further, cladding in this way provides the cost saving benefit of using less cladding than that of prior efforts that provide cladding beyond the cutting edge. Cladding that extends beyond the blade body 34 to provide a cutting edge requires incurring more cost because of the large amount of required cladding. Further, more expense is required in cladding beyond the blade body because the serration of the cutting edge is only provide for by incurring expensive machining costs in the machining of a serrated edge into the cladding. In an embodiment, more than 50% of the cutting edge 44 is comprised of the base material before and after use. Fewer beads also can be deposited saving time and cost.

Turning briefly then to FIGS. 8 and 9, the angle 80 at which the laser clad beads 52 are deposited relative to the cutting edge 44 and the width 54 between the laser clad beads 52 can provide additional benefit with potential sliding action during cutting. It is preferably angled radially outwardly as the bead 52 extends from the leading face 46 to the trailing face end 47.

As the blade 20 is used to cut a crop 14 the wear and wave patterns 55 of the cutting edge 44 occurs and a wave pattern 55 is formed along the cutting edge 44. Each crest 56 of each wave in the wave pattern 55 along the cutting edge 44 is made up of the laser clad material 52 of the second hardness while each wave trough 58 is made up of the base material of the blade body 34 of the first hardness.

In some embodiments, the beads 52 are deposited at 90 degrees.

In another embodiment, if the laser clad beads 52 are deposited such that they extend perpendicular to the cutting edge 44, the wave pattern effect may be too severe along the cutting edge 44 such that the depth 78 of the troughs 58 into the base material is too severe. The depth 78 of the trough 58 is the distance from the cladding end 68 inwards toward the outermost periphery 32 of the blade body 36 of the first material. The severity in depth 78 is the result of a wear rate of the base material that is too fast relative to that of the laser clad beads 52 of the second material. As such, too much of the base material wears away too quickly which in turn produces pre-mature breaking of the cutting edge 44 and the entire blade body 34.

To avoid this effect, the angle 80 at which each laser clad bead 52 is deposited relative to the cutting edge 44 is controlled as is the width 54 between each bead 52. This control of the angle 80 and width 54 is provided, as previously discussed, by depositing each laser clad bead 52 so as to extend from the cutting edge 44 transversely towards the central longitudinal axis of 50 of the blade body 34 at angle 80 of between 45 to 55 degrees relative to the cutting edge 44.

Further, the laser clad beads 52 are space apart from one another so as to define a width 54 at the cutting edge 44. Typically, the width 54 between the laser clad beads 52 is between 0.5 and 5 mm. This distance functions to create a wear pattern of several teeth spaced to both limit wear and cut in a wave pattern with teeth.

Turning back to FIGS. 5-7, the cutting edge 44 typically has a length 60 of between 7.5 and 20 cm. The blade 20 itself typically has a blade length 64 of between 1.5 and 15 cm. Further, a material thickness 66 of the blade 20, that is the width between the top surface 38 of the blade 20 and the bottom surface 40 of the blade 20, is substantially uniform and typically between 2 and 15 mm. In a preferred embodiment the blade length 64 is 10 cm and the cutting edge 44 length is 7.5 cm, and the material thickness 66 of the blade 20 is 5 mm. Thereby, the blade 20 dimensions make it particularly adapted for use as a mower blade.

As illustrated, the cutting edge 44 extends along a full length 60 of the cutting face 46. The laser clad beads 52 do not extend along the full length 60 of the cutting edge 44. That is, a length 62 at an end of the cutting edge 44 and along the cutting face 46 is free of any laser cladding before and after use. In an embodiment, prior to use and after use 50 percent of the cutting edge 44 is free of the laser clad beads 52. Further, over 80 percent of the bottom surface 40 is free of cladding.

Also, as illustrated, the beads 52 have a tapered profile 63 along the bottom surface 40 of the blade 20. That is, the length of each extension of laser clad bead 52 increases from the innermost area along the cutting face 46 towards an outermost end 86 of the cutting face 46 at least until the plurality of beads 52 reaches the outermost end 86 where the laser clad bead 52 length again decreases within the limits defined by the outermost end 86 and the cutting edge 44.

The length of the laser clad bead 52 is readily understood to mean the distance from at or adjacent the cutting edge 44 to a terminal end of the clad bead as it extends towards the central longitudinal axis 50 and the trailing face 47 of the blade 20. The tapered profile 63 provides for increased strength of that part of the blade 20 at the cutting face 46 and extending in the tapered profile along the bottom surface 38. Thus, the laser clad beads 52 in the tapered profile 63 prevent wear and breakage of the blade 20 while minimizing the amount of laser clad material through a very targeted and limited deposits along the bottom surface 38.

The hardened beads 52 have a width 70 between 0.5 and 20 mm. The hardened beads 52 have a depth 72 and are 10 to 30 percent of the material thickness 66. The steel material hardness of the blade body 34 is between HV 400 and 650 in the Vickers Hardness Scale. The hardened beads 52 are harder in comparison to the steel blade body 34 material and can comprise at least one of the materials comprising tungsten carbide, chrome carbide, iron carbide, ceramic and other material having a Vickers Hardness Scale hardness between HV 700 to 1400.

Turning now to FIG. 10, an embodiment of blade 20 is illustrated. The embodiment is similar in every respect to that blade 20 which has been heretofore described except that in this embodiment blade 20 includes a second plurality of hardened beads 82 deposited, as with the first plurality of hardened beads 52, only after the cutting face has been machined. As with the first plurality of hardened beads 52, the second plurality of hardened beads 82 are preferably not machined or sharpened. Moreover, all the characteristic of the material comprising the second plurality of beads 82, for example, its thickness 72 and width 70 of deposits are the same as that which has been described with respect to the first plurality of hardened beads 52. As can be seen in the illustration, the second plurality of hardened beads 82 provides an additional backing to the bottom surface 40 are deposited so as to produce a crisscross pattern with the first plurality of hardened beads 52 along the bottom surface 38.

In this embodiment blade 20 has a radial end 84 in opposed space relation to an outermost end 86 of the blade 20. The second plurality of hardened beads 82 includes an outermost end portion 88 and a cutting edge portion 90. Each one of the extensions of the hardened bead portions 88, 90 is deposited so as to be spaced apart from another one of the extensions the hardened bead portions 88, 90 to define a width 54 between each one of the extensions of the hardened bead portions 88, 90 along cutting edge 44 and outermost end 86. Additionally, each one of the extensions of the second plurality of hardened beads 82 is deposited so as to be spaced apart from one of the extensions of the first plurality of hardened beads 52 so as to define and keep the same width 54 between them.

Each one of the hardened bead extensions of the cutting edge portion 90, like each one of the extensions of the first plurality of hardened beads 52, extends from a bead end 68 at or adjacent the cutting edge 44. Each one of the bead extensions of the cutting edge portion 90 is deposited so as to be approximately perpendicular in relation to one of the hardened bead extensions of the first plurality of hardened beads 52 and thus provide for the crisscross pattern of the first and second bead pluralities.

Each one of the extensions of the cutting edge portion 90 extends towards the central longitudinal axis 50 of blade 20 and towards the radial end 86 of blade 20. In other words, whereas each one of the hardened bead extensions of the first plurality of hardened beads 52 have an angle 80 of between 45 and 55 degrees as measured relative to the cutting edge 44, here, the angle 81 of each extension of the cutting edge portion 90 is between 135 and 145 degrees relative to the cutting edge 44.

Each one of the extensions of the outermost end portion 88 extends from along from at or adjacent the outermost end 86 towards the central longitudinal axis 50 at an angle 83 of between 45 to 55 degrees relative to the outermost end 86.

Accordingly, like blade 20, here the angles 80, 81 at which the first 52 and second 82 plurality of hardened beads are deposited relative to the cutting edge 44 and the width 54 between each one of the extensions of cutting edge portion 90 determines the degree of wear/wear pattern 55 that will occur during use. The second plurality of hardened beads 82 provides the advantage of reinforcing the bottom surface 40 and in particularly the outermost end 86 of the blade 20 so as to prevent premature wear of the blade 20 including breaks in the blade 121.

Turning to FIG. 11, as the blade 20 of the embodiment just described, that is the one with the first and second pluralities of hardened beads 52, 82 is used to cut a crop 14 the same wave pattern 55 and thus self-sharpening of the cutting edge 44 that occurs with blade 20 of a single plurality of hardened beads 52 occurs.

Figure 12:
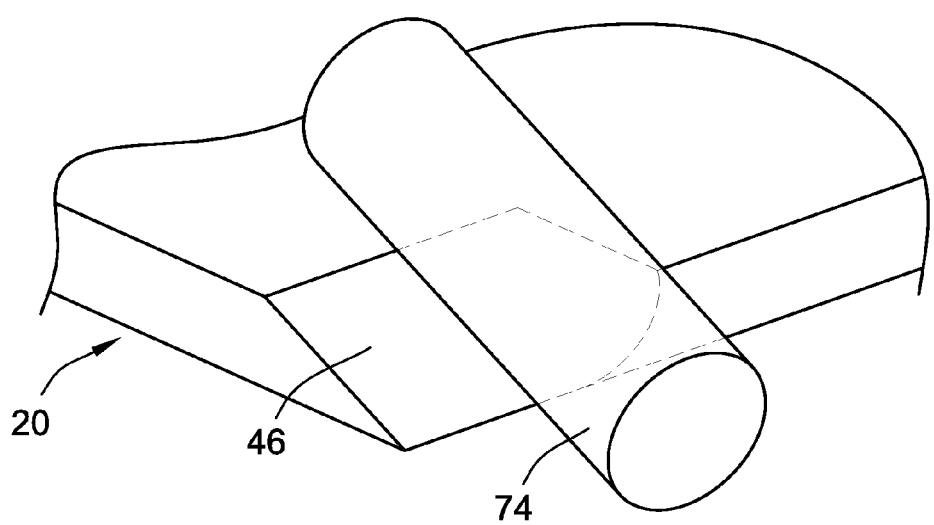
FIG. 12 is a schematic illustration of machining a cutting face according to an embodiment of the present invention.
Figure 13:
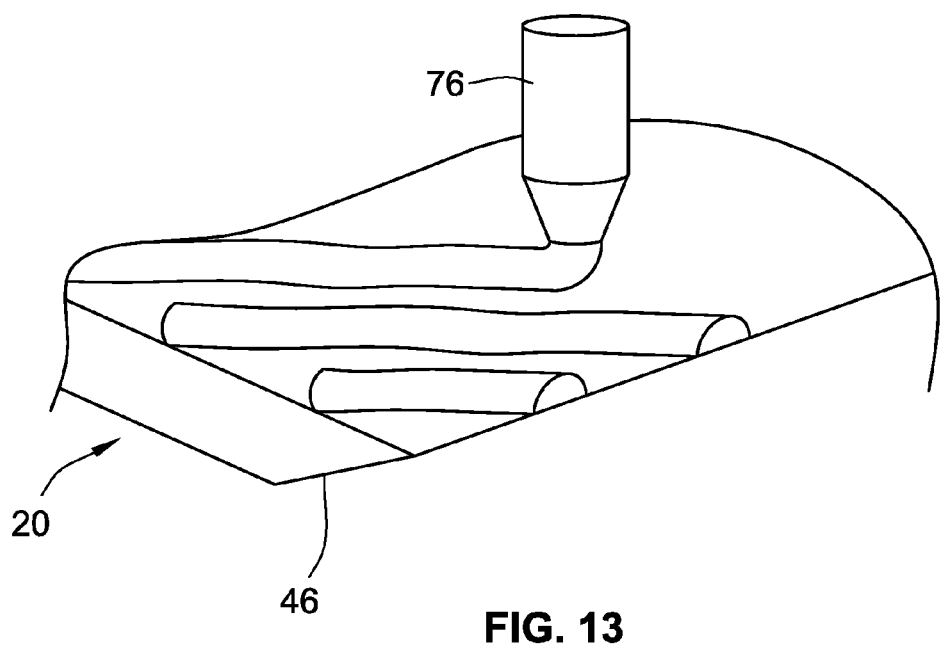
FIG. 13 is a schematic illustration of laser cladding a cutting blade according to an embodiment of the present invention.

As has been discussed the invention provides for a method that includes the step of grinding and or otherwise machining the cutting face 46 with a machine 74, as illustrated in FIG. 12, or forming the cutting face 46 (not illustrated) into the blade body 36 prior to the step of cladding hardened beads 52 via a laser clad machine 76 onto the bottom surface 40 of the blade body 36, as illustrated in FIG. 13. The laser clad beads 52 are not machined and or ground before use.

Figure 14:
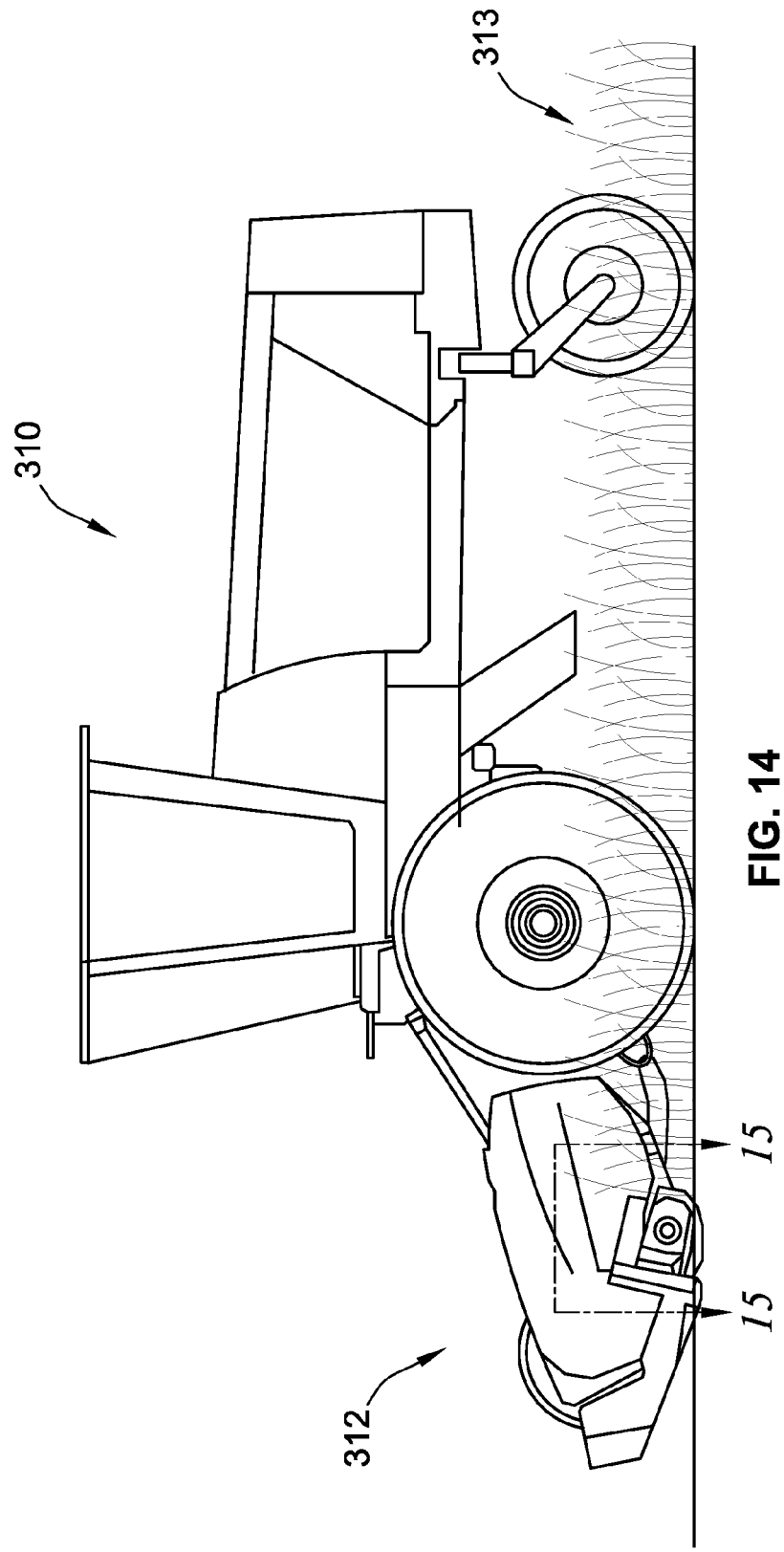
FIG. 14 is an illustration of a tractor pulling a mowing machine.

FIG. 14 illustrates a tractor 310 pulling a mowing machine 312 through a stand of crop 313. The mowing machine 312 may either be self-propelled or as shown here pulled and powered by the tractor 310.

Figure 15:
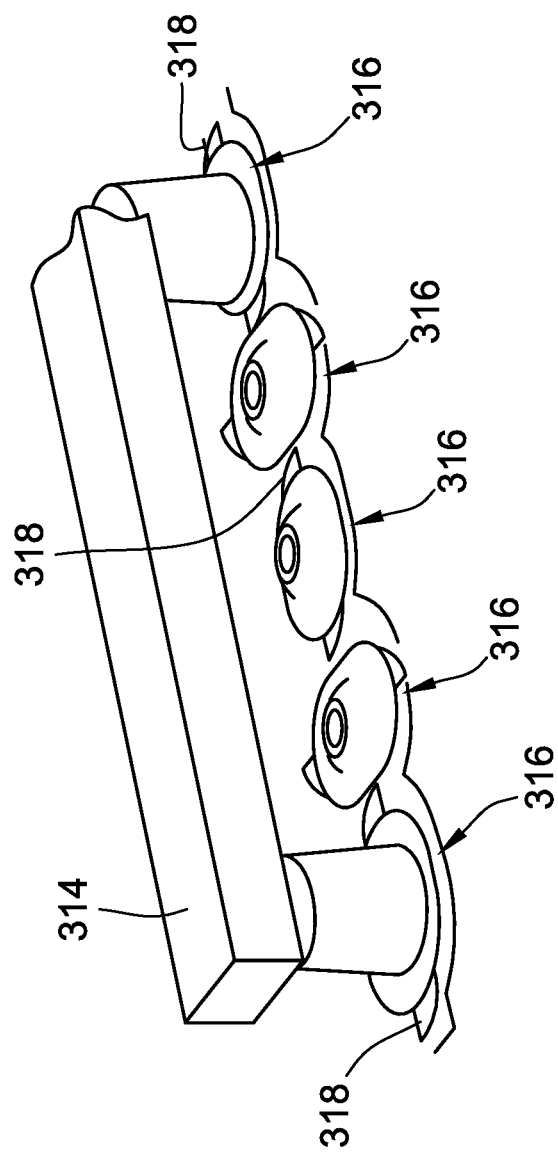
FIG. 15 is a partly schematic isometric illustration of a disc mower cutter bar including a plurality of discs holding a plurality of mower blades.

FIG. 15 illustrates a mower disc cutter bar 314 that forms a part of the mowing machine 312 shown in FIG. 14. The mower disc cutter bar 314 supports a plurality of mower disc assemblies 316, which in turn support a plurality of mower disc blades 318 (also known as cutter blades and/or knives).

Figure 16:
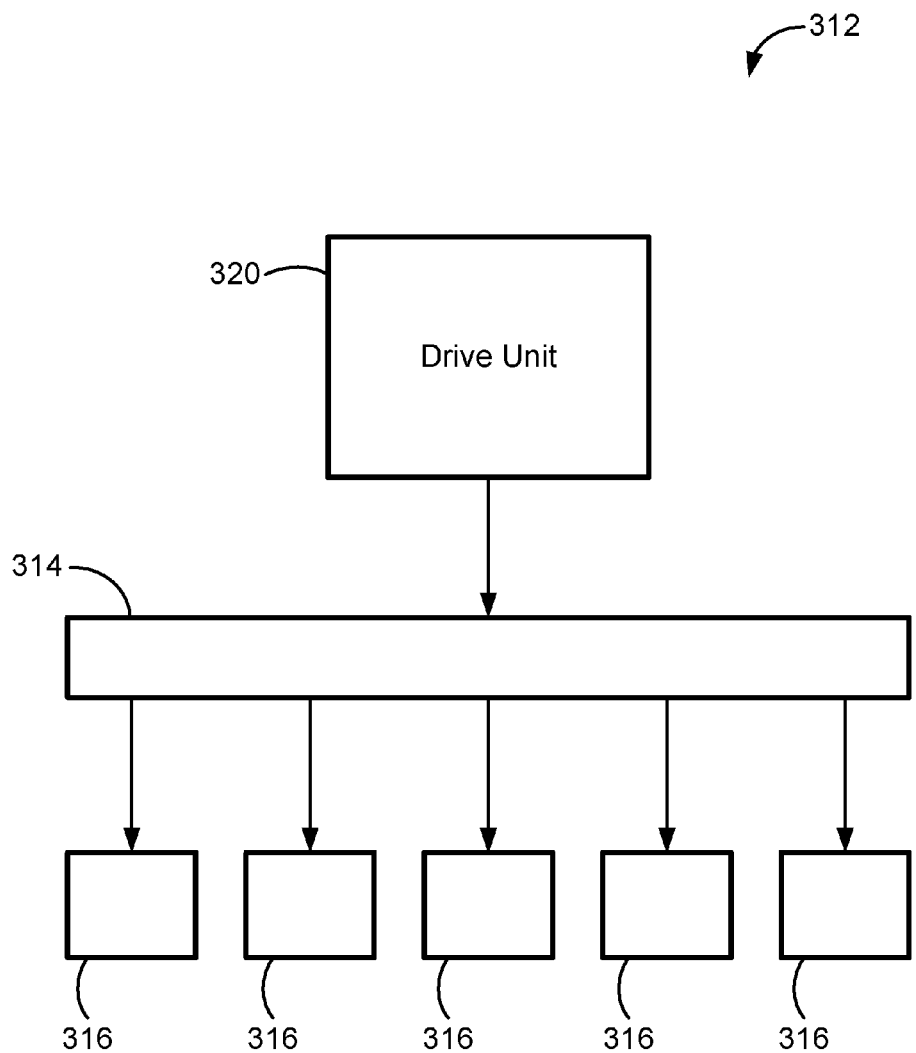
FIG. 16 is a schematic view of a mowing machine.

FIG. 16 illustrates a schematic view of a mowing machine 312. The mowing machine 312 includes a drive unit 320 for driving a rotary cutter bar 314. The rotary cutter bar 14 includes a plurality of mower disc assemblies 316 that each contain a plurality of slicing disc mower blades 318 (see FIG. 15). While the mowing machine 312 is illustrated as including a plurality of mower disc assemblies 316, it is contemplated that as few as one mower disc assembly 316 could be employed in certain applications.

Figure 17:
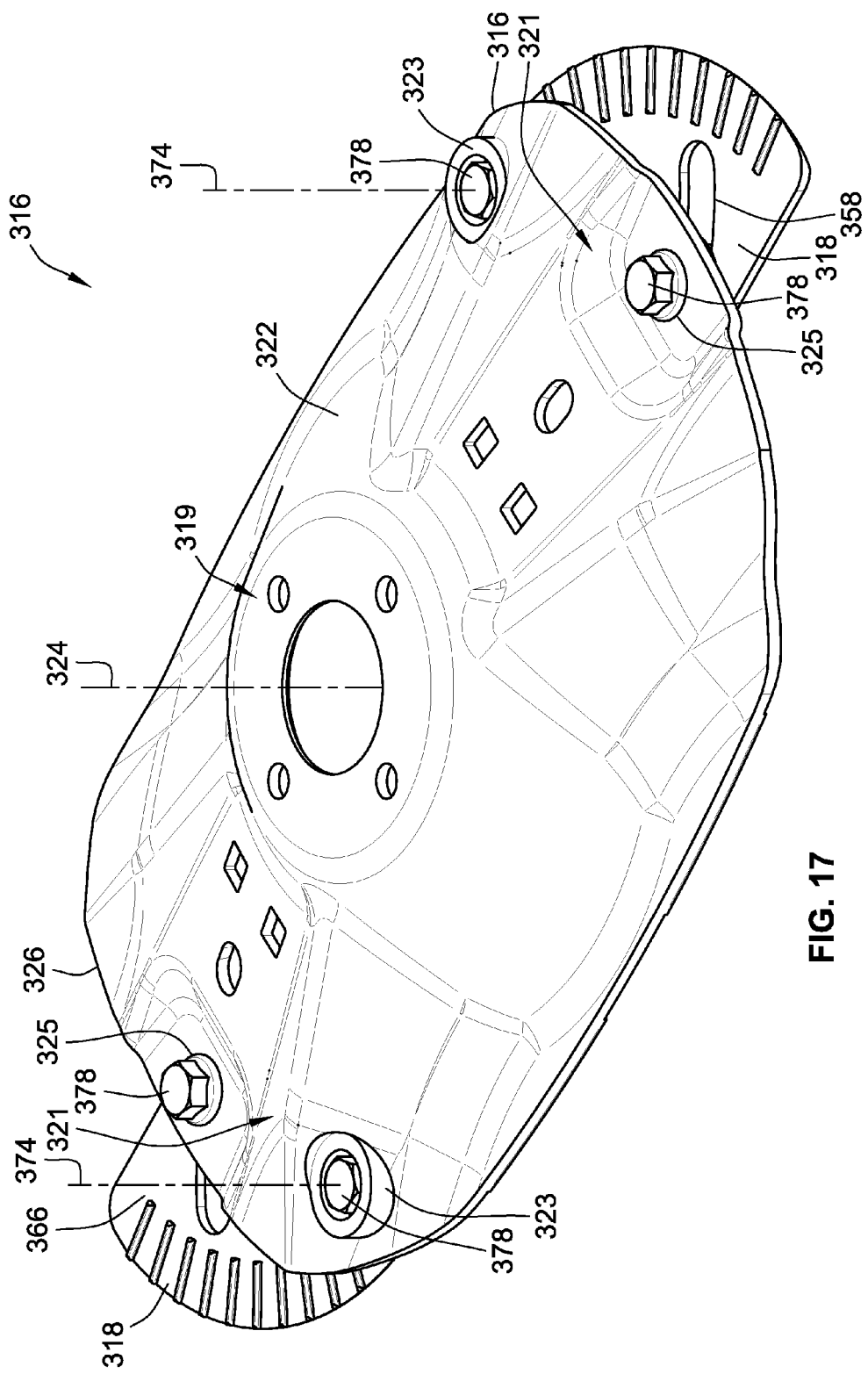
FIG. 17 is an isometric view of a mower disc assembly.

FIG. 17 illustrates an isometric view of a mower disc assembly 316 including slicing disc mower blades 318.

The mower disc assembly 316 includes a mower disc body 322. The mower disc body 322 defines a mounting location 319 which attaches to the rotary cutter bar 314 (see FIGS. 14-15) that is in turn driven by the drive unit 320. The drive unit 320 causes the mower disc assembly 316 to rotate about a mower disc body 322 that defines a central axis of rotation 324. The mower disc body 322 may include two blade mounting locations 321. Each blade mounting location 321 includes a first blade mounting location 323 and a second blade mounting location 325. In the embodiment shown in FIG. 17 the first and second blade mounting locations 323, 325 are apertures or boss structures through which fasteners 378 are inserted to mount blade 318. While two blade mounting locations 321 are illustrated it can be readily appreciated that only a single blade mounting location may be provided on the mower disc body 322 or more than two blade mounting locations 321 may be provide so long as the blade/blades 318 when mounted are balance during the rotation of the mower disc body 322.

As illustrated, the two blade mounting locations 321 are positioned toward a bottom of the mower disc body 322 so as to balance the blades 318 such that during rotation, the blades 318 will extend outwards beyond a mower disc body 322 outer periphery 326 under centrifugal force. Each blade 318 pivots about a blade body 366 axis of rotation 374. The pivoting motion is limited by a blade body retainer 358 that will be more fully described below. Accordingly, it is not the intent to limit the mounting location structures to apertures or bosses with bolts. Any suitable retainer structure to mount the blade 318 to the mower body 322 may be utilized provided the blade 318 may pivot outwards to extend beyond the mower body 322 outer periphery 326 under a centrifugal force generated by the mower disc body 322 in rotation.

As the mower disc assembly 316 is brought into contact with a crop 313 or foliage to be mowed, the cutter blades 318 will slicingly impact the crop or foliage and thereby slice an upper portion of the crop or foliage from its root system. This slicing of the crop will be more fully explained below.

Turning now to FIGS. 18, 19 and 20, respectively, a bottom view, side view and top view of a blade 318 for a mower disc body 322 are shown. The blade 318 may be stamped formed from sheet steel to include a blade body 366 of a hardness between HV 400 and 650 on Vickers scale. The blade body 366 has opposed top 362 and bottom 364 surfaces. An outer surface 360 extends around the blade body 366 vertically between the top 362 and bottom 364 surfaces. The blade body 366 includes a first 356 and second 358 aperture in spaced apart relation. A cutting edge 328 extends along an outermost periphery 239 of outer surface 360 of the blade 318. The outermost periphery 329 of outer surface 360 of the blade 318 may extend a distance L of typically between 5 and 50 centimeters and more preferably between 5 and 25 centimeters.

The first 356 aperture is a retainer structure that defines a blade body 366 axis of rotation 374 for pivoting movement. The second retainer structure 358 may be an elongated slot. The elongated slot 358 defines a first stop 368 and a second stop 370. The elongated slot 358 is adapted to limit the pivoting movement of the blade body 366 by way of its stops 368 and 370.

The top surface 362 of the blade 318 further includes a plurality of hardened beads 354 spaced apart and of a second hardness greater than the first hardness. The hardened beads 354 may comprise laser clad material deposited along an extension 372 extending radially inward towards the mower disc body 322 and perpendicular or within 345 degrees of perpendicular to a tangent 348 along the convex cutting edge 328.

The blade body 366 further includes a tapered cutting face 360 formed into the bottom surface and intersecting the cutting edge 328. The tapered cutting face 360 is sandwiched between the top surface 362 and the bottom surface 364 of the blade body 366 and extends radially inward from the top surface 362 to the bottom surface 364. The cutting edge 328 is formed along the top surface 362. The blade body 366 may be comprised of a sheet steel formed component of a material thickness 380 (see FIG. 21) that is substantially uniform. Typically, the blade material thickness 380 is between 3 mm and 6 mm. Thereby, the blade 138 dimensions make it particularly adapted for use as a mower blade. It may be readily appreciated that it is not the intent to limit construction of the blade body 366 only to sheet steel. Comparable materials such as cast steel and stainless steel may be utilized to form the blade body 366.

The hardened beads 354 have a thickness 382 and are 10 to 30 percent of the material thickness 380. The steel material hardness of the blade body 366 is between HV 400 and 650 in the Vickers Hardness Scale. The hardened beads 354 are harder in comparison to the steel blade material and can comprise at least one of the materials comprising tungsten carbide, chrome carbide, iron carbide, ceramic and other material having a Vickers Hardness Scale hardness between HV 700 to 1400. The hardened beads may be comprised of laser clad material deposited along a plurality of extensions 372 with each extension 372 spaced apart from the other extensions 372 and each extending transversely away from cutting edge 328 and radially inwards towards curved edge 332 of blade body 366. The benefit of this is to provide for a self-sharpening blade, that is as the softer blade body material wears away during use, the harder beads remain as the outermost periphery 329 of the blade 318 thereby providing for a serrated self-sharpened cutting edge 328.

Turning now to FIGS. 21 and 22, a top view of a mower disc assembly 316 and an elevated side view of the mower disc 316 assembly are illustrated.

A mower disc body 322 is adapted to rotate about a central axis 324. The mower disc body 322 includes an outer periphery 326. At least one blade 318 is mounted to the mower disc body 322 and extends radially outward from the outer periphery 326 of the mower disc body an X radial distance. The at least one blade 318 has a cutting edge 328 that extends along a length of a Y distance from a leading end 336 to a trailing end 338 of the cutting edge 328. The Y distance in a preferred embodiment the Y distance may be more than 1.5 times as great as the X radial distance. In a more preferred embodiment the Y distance may be two times as great as the X radial distance. In an even more preferred embodiment the Y distance may be 2.5 times as great as the X radial distance.

The functional benefit of the relationship between the X and Y distance is to provide a cutting edge 328 length beyond the mower disc body outer periphery 326 that facilitates the slicing action of the convex blade 318 as it moves through a crop 313.

In an embodiment the X distance will be between 5 and 15 centimeters. The Y distance will typically be between 5 and 50 centimeters and more preferably between 5 and 25 centimeters.

As illustrated, rotation about the central axis 324 of the mower disc body 322 is in a counterclockwise first direction 334. It can be readily appreciated in yet other embodiments the mower disc assembly 316 may very well be reoriented to rotate in a clockwise direction. Reference throughout the description is with respect to the mower disc assembly 316 adapted for counterclockwise rotation in first direction 334. However, the claims appended hereto are generic to both rotational directions.

The cutting edge 328 extends along a trailing path from a leading end or location 336 to a trailing end or location 338 relative to the central axis 324 in predetermined rotational movement defined by the mower disc body 322 when the blade 318 is mounted to the mower disc body 322. The leading location 336 and the trailing location 338 are separated in a preferred embodiment by an angular distance 344 of at least 120 degrees. In a more preferred embodiment the angular distance 344 is at least 30 degrees with the leading location and the trailing location separated between 5 and 25 centimeters.

In an embodiment the functional benefit of this may be to provide a cutting edge 328 length beyond the mower disc body outer periphery 326 that facilitates the slicing action of the convex blade 318 as it moves through a crop 313. The angular separation between the leading edge and the trailing end allow the crop to be sliced instead of impact cut as is the case with rectangular blades. The angular separation allows the crop 318 to slide along and remain in contact with the cutting edge 328 over a longer time and distance relative to a traditional rectangular blade impacting the crop along a limited surface of its blade. The slicing provided thereby increases blade 318 life because slicing produces less blade wear than an impact cut from a traditional rectangular blade, further such a blade 318 is more efficient in terms of harvesting the crop 313 and also demands less power to operate.

The cutting edge 328 includes a curved portion 346 that defines a tangent 348 that defines an acute angle 350 that is greater than 45 degrees with a radial extension 352 extending from the central axis. In that manner, the convex cutting edge 328 has an advantageous length that provides for the greatest amount of time and distance for the crop 313 to be sliced during operation.

The blade body 366 is connected to the mower disc body 322 at a hinge 356 that allows for articulating movement of the at least one blade 318. The blade body 366 is also connected to the mower disc body 322 at a slide retainer 358 at a location trailing the first hinge 356. The at least one blade 318 has an articulating movement limited by the slide retainer 358 between first stop 368 and second stop 370. Under centrifugal force generated by the mower disc boy 322 in rotation, the blade 318 is able to pivot about axis 734 until stopped by second stop 370 of the second hinge 358. Thus, the mower disc body 322 may rotate in a first direction 334 about the central axis of rotation 324 while the blade body 366 is simultaneously able to rotate about the blade body 366 axis of rotation 374 in a second and opposite direction of the first direction 334. The ability of the blade 318 to move in a direction opposite that of the mower body 322 together with beveled edge 360 provide the advantage of allowing the blade 318 to give way by rotating away from an obstruction and thereby prevent damage to the blade 318 if the instruction turned it out to be an immovable object. Further, this ability prevents such undesirable objects such as stones form being hurled into the air at tremendous velocities. Instead the blade 318 is able to pivot away from the object as the face 360 works to direct a downward force on the object further decreasing any projectile velocity.

When cutting crop with a knife blade, a slicing action rather than an impact/shearing action is more efficient. The way the slicing action in this embodiment is achieved is by facing the crop being cut with a cutting edge that has an oblique angle in relation to the rotating motion of the mower disc assembly into the crop being cut. Even more specifically this slicing action in this embodiment is achieved by facing the crop 313 being cut with a blade 318 that has the large convex cutting edge 328 over a radially inward tapered cutting face 360 where the taper extends radially inward from the top surface 362 to the bottom surface 364.

As the blade 318 is rotating, the stalks of the crop 313 come into contact with the convex cutting edge 328. The blade 318 begins to impact the stalk 313 and stalks 313 start sliding along the edge of the direction of least resistance. This happens in a matter of a very few milliseconds since the blade 318 is traveling at approximately 80 meters per second, but the effects of the sliding action are realized in the amount of energy used to sever the stalks is reduced.

The blade body 366 includes a leading hardened bead 376 and a plurality of trailing hardened beads 354. The trailing hardened beads 354 are located in series trailing the leading location 336. The laser clad hard metal beads 354 running tangent to the cutting edge 328 allow the cutting edge 328 to self-sharpen. That is, the blade body 366 of the first hardness wears at a much faster rate than the hardened metal beads 354 of the second hardness. Thus, as the softer material of the first hardness erodes radially inward the hardened beads 354 are left in place and create the desired self-sharpening effect of a serrated cutting edge 328.

Typically, a rectangular blade wears primarily at the corner of the outer leading edge of the blade. Further a conventional rectangular mower blade does not slice the crop as does the convex cutting edge 328, rather it impacts the crop to cut it. In this way, the typical rectangular blade quickly becomes dull and the cutting efficiencies continue to get worse until the blade is no longer useful. Thus, an advantage of the present embodiment is that the convex cutting edge 328 may provide four times the amount of cutting edge of a typical rectangular blade's cutting edge. Further, with the convex cutting edge 328 the cutting of the crop is distributed evenly along the entire length of the cutting edge 328 to provide an even wear pattern thus outlasting the conventional rectangular blade by approximately four times. Also, because the cutting of the crop 313 is evenly distributed along at the curved cutting edge 328, the cutting efficiencies will tend to remain the same from the start of the blade until it is completely worn out.

In an embodiment two blades 318 are mounted to the disc mower body 322 in diagonally opposed space relation. It can be readily appreciated the aforementioned mounting permits a balanced rotation of the mower disc body 322 about central axis 324. Accordingly, more or less blades 318 in yet other embodiments are envisioned. For example, an embodiment may have four blades 318 mounted to the mower disc body 322 provided they are opposed space relation and balanced when the mower disc body 322 is in rotation about central axis 324.

Turning now to FIGS. 23, 24 and 25, respectively, a bottom view, side view and top view of a blade 418 for a mower disc body 322 (FIG. 17) are shown. The blade 418 is similar in most respects to blade 318 (FIG. 18) previously discussed but differs in that graduated cutting teeth 484 are formed into the blade body 466 at the time the blade body 166 is formed which may be by stamping for a non-limiting example.

Thus, as with blade 318, blade 418 with its graduating cutting teeth 484 may be formed from sheet steel to include the blade body 466 of a hardness between HV 400 and 650 on Vickers scale. The blade body 466 has opposed top 462 and bottom 464 surfaces. An outer surface 460 extends around the blade body 466 vertically between the top 462 and bottom 464 surfaces. The blade body 466 includes a first 456 and second 458 aperture in spaced apart relation. A cutting edge 428 and extends along an outermost periphery 429 of outer surface 460 of the blade 418. The cutting edge 428 of outer surface 460 of the blade 418 may extend a distance L of typically between 5 and 50 centimeters and more preferably between 5 and 25 centimeters.

The blade body 466 may be comprised of a sheet steel formed component of a material thickness 480 that is substantially uniform. Typically, the blade material thickness 480 is between 3 mm and 6 mm. Thereby, the blade 418 dimensions make it particularly adapted for use as a mower blade. It may be readily appreciated that it is not the intent to limit construction of the blade body 466 only to sheet steel. Comparable materials such as cast steel and stainless steel may be utilized to form the blade body 466.

The blade body 466 includes a first 456 aperture that is a retainer structure that defines a blade body 466 axis of rotation 474 for pivoting movement. The second retainer structure 458 may be an elongated slot. The elongated slot 458 defines a first stop 468 and a second stop 470. The elongated slot 458 is adapted to limit the pivoting movement of the blade body 466 by way of its stops 468 and 470.

The top surface 462 of the blade 418 further includes a plurality of hardened beads 454 spaced apart and of a second hardness greater than the first hardness. The hardened beads 454 may comprise laser clad material deposited along an extension 472 extending radially inward towards the mower disc body 322 and perpendicular or within 45 degrees of perpendicular to a tangent 448 along the cutting edge 428. The hardened bead 454 has a maximum circumferential width 455 that extends along the cutting edge 428 of the top surface 462 of the blade body 466.

Unlike blade 318, here, the cutting edge 428 of the blade 418 includes the graduated cutting teeth 484. Thus the cutting edge 428 contains cutting segments 477 that break up the continuous cutting edge 428 of the previous embodiments discussed with respect to blade 318. Each tooth 484 is formed between each of the spaced hardened beads 454. Thus, the cutting edge 428 is comprised of a trailing edge portion 490, a center edge portion 494, and a leading edge portion 496. (FIG. 25). The leading edge portion may be free from any of the graduated cutting teeth 484 and extends along the outer surface 460 of the blade 418 a greater distance than any individual tooth of the graduated cutting teeth 484.

The trailing edge portion 490 and the leading edge portion 496 of the cutting edge 428 are similar in that each include a tapered cutting face 461 formed into the bottom surface 464 and intersecting the cutting edge 428. The tapered cutting face 461 is sandwiched between the top surface 462 and the bottom surface 464 of the blade body 466. The tapered cutting face 461 extends radially inward to the bottom surface 464 and forms in an embodiment an angle 463 between 30 and 60 degrees with the top surface 462 of the blade body 466. In a preferred embodiment the angle is between 30 and 45 degrees, and in a more preferred embodiment the angle is between 30 and 32 degrees. This same angle 463 is present in all the blade 318 embodiments heretofore described with respect to top surface 362 and cutting face 360, as cutting face 360 tapers radially inward to meet bottom surface 364 along the cutting edge 428.

The center edge portion 494 extends along the cutting edge 428 between the leading edge portion 496 and trailing edge portion 494 and comprises between 50 percent and 90 percent of the cutting edge 428 of blade 418.

The hardened beads 454 and the graduated cutting teeth 484 extend along the cutting edge 428 in the center edge portion 494 of the blade body 466. The center edge portion 494 in an embodiment may have 3 to 20 cutting teeth. In a preferred embodiment the center edge portion may have between 4 and 15 cutting teeth 484 and an even more preferred embodiment the center edge portion may have between 5 and 10 cutting teeth 484.

Turning now to FIGS. 26-27, each cutting tooth 484 of the center edge portion 494 is comprised of a tip face 486, a relief face 488 and a beveled cutting face 489.

The tip face 486 has a maximum beveled cutting face length 504 along top surface 462 that approximates a maximum circumferential length 455 of the hardened bead 454. The tip face 486 extends inward toward curved edge 432 and in a tapered fashion from the top surface 462 to the bottom surface 464 to form a tip face taper 512. The tip face taper 512 is intended to approximate the taper 461 of the leading edge portion and trailing edge portion of cutting edge 428.

The relief face 488 of the tooth 484 extends from approximately a tip face trailing edge 508 to an inward most beveled cutting face edge 510 of the beveled cutting face 489 and thereby providing a depth 487. Thus, the relief face 488 extends transversely and inwardly away from the outermost periphery 429 of the cutting edge 428. Typically the depth 487 is between 5 mm and 25 mm. In a preferred embodiment the depth is between 5 mm and 10 mm.

Further, the relief face 488 extends from the top surface 462 to the bottom surface 464. The relief face 488 and the beveled cutting face 489 meet to form and angle 502 between the two faces 488, 489 at the top surface 462 of the valve body 466. In an embodiment, the angle 502 may be between 60 and 120 degrees. In a preferred embodiment, the angle may be between 80 and 100 degrees. In a more preferred embodiment, the angle may be between 90 and 91 degrees. The relief face 488 and the beveled cutting edge face 489 are arranged to create a step 476.

The beveled cutting face 489 extends from a tip face trailing edge 506 to the inward most beveled cutting face edge 510 and thereby provides for a beveled cutting face length 491 of the beveled cutting face 489 extending along the top surface 462 of the blade body 466. The beveled cutting face length 491 along the top surface 462 is one of the cutting edge 428 segments 477 previously discussed. The beveled cutting face length 491 of each of the beveled cutting faces 489 gradually decrease, that is get shorter, with each tooth 484 the farther the graduated teeth 484 are from the leading end 436. (FIG. 25). The beveled cutting face 489 tapers radially inward from the top surface 462 to the bottom surface 464. The taper 510 of the beveled cutting face 489 may be obtained by sharpening on a machine such as a mill for example to provide a flat cutting edge and surface.

The hardened beads 454 have a thickness 482 and are 10 to 30 percent of the material thickness 480. The steel material hardness of the blade body 466 is between HV 400 and 650 in the Vickers Hardness Scale. The hardened beads 454 are harder in comparison to the steel blade material and can comprise at least one of the materials comprising tungsten carbide, chrome carbide, iron carbide, ceramic and other material having a Vickers Hardness Scale hardness between HV 700 to 1400. The hardened beads 454 may be comprised of laser clad material deposited along a plurality of extensions 472 with each extension 472 spaced apart from the other extensions 472 and each extending transversely away from cutting edge 428 and radially inwards towards curved edge 432 of blade body 466. The benefit of this is to provide self-sharpening for blade 418. That is, as the softer material of the blade body 466 wears away during use, the harder beads 454 remain to cut crop 313 (FIG. 14) and thereby improve the cutting action of the already serrated cutting edge 428. By such self-sharpening, the life of blade 418 is increased even more than that of the embodiments discussed with blade 318.

In addition to extending blade 418 life, other advantages of the cutting blade 418 with cutting teeth 484 include cutting crop 313 in nibbles, that is small bites, along the cutting edge 428. It can be readily appreciated that each tooth 484 provides for a slicing action in cutting crop 313 (FIG. 14) along the sharpened beveled cutting face 489 with length 491 that gets shorter and the relief face 318 that gets longer the farther the graduated cutting teeth are from the leading end 436. These graduated lengths provides optimal bites, that is cutting of the crop 313 in nibbles as crop 313 traverses the segmented central cutting edge portion 494. Further, advantage is found with this embodiment as just discussed with the self-sharpening of the blade 418 that is the result of the wearing away of the blade body 466 material that is softer than that of the hardened beads 454.

Thus, the cutting efficiency and blade life are thereby extended by this particular blade body 418 with the cutting teeth 484 along the center edge portion 494 of the cutting edge 428.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cutting blade comprising:
 a cutting blade body comprising a first base material comprising steel, the cutting blade body comprising:
 first and second opposed surfaces,
 an outer surface extending around the cutting blade body transversely between the first and second opposed surfaces;
 a cutting edge along formed along the outer surface; and
 regions of cladding extending along one of the first and second opposed surfaces transversely away from the cutting edge; and
 exposed metal surface regions of the first base material along the cutting edge between regions of cladding;
 wherein the first base material is of a first hardness having a first wear rate with use, and wherein the cladding is of a second material of a second hardness having a second wear rate with use, wherein the first hardness is less than the second hardness and wherein the first wear rate of the first material is greater than the second wear rate of the second material;

wherein the cutting blade and the cutting edge are non-serrated in an unused condition, and wherein the arrangement of the regions of cladding and the exposed metal regions are configured such that during cutting the cutting blade is adapted to create a serrated pattern due to the respective wear rates.

2. The cutting blade of claim 1, wherein the cutting edge along a ground face is formed by the first base material in an unused condition and, wherein the cutting blade is configured such that the plurality of clad beads are at the cutting edge in the unused condition are sufficiently adjacent to the cutting edge such that the plurality of clad beads become part of the cutting edge over time during use.

3. The cutting blade of claim 1, wherein the regions of cladding comprise a plurality of laser clad bead segments.

4. The cutting blade of claim 1, wherein the laser clad bead segments are discontinuous and not interconnected.

5. The cutting blade of claim 1, wherein no part of the regions of cladding, other than flash, extends forward of the cutting edge in the unused condition, a leading end of the clad beads being between 0 mm and 5 mm of the cutting edge.

6. The cutting blade of claim 1, wherein the cutting blade includes a clad bead application region, the regions of cladding occupying 20% to 80% of the clad bead application region and free regions of first base material exposed between the clad beads comprising 20% to 80% of the clad bead application region.

7. The cutting blade of claim 1, wherein the exposed metal surface regions occupying a spacing between the regions of cladding adjacent to the cutting edge, each spacing being between 0.5 mm and 20 mm to control depth of the wave pattern during wear.

8. The cutting blade of claim 1, wherein the cutting edge is linear.

9. The cutting blade of claim 1, wherein the cutting edge is curved.

10. The cutting blade of claim 9, further comprising at least one mounting aperture formed into the first base material along an axis of rotation.

11. A method of using the cutting blade of claim 1, comprising engaging the blade with a working medium during use in an agricultural application, and creating a serrated pattern from the engaging by more rapidly wearing the cutting edge at first locations of the exposed metal surface regions than second locations of the regions of cladding.

12. A cutting blade comprising:
a cutting blade body comprising a first base material comprising steel, the cutting blade body comprising:
first and second opposed surfaces,
an outer surface extending around the cutting blade body transversely between the first and second opposed surfaces;
a cutting edge along formed along the outer surface; and
regions of cladding extending along one of the first and second opposed surfaces transversely away from the cutting edge; and
exposed metal surface regions of the first base material along the cutting edge between regions of cladding;
wherein the regions of cladding comprise a plurality of laser clad bead segments; and
wherein the laser clad bead segments are interconnected with each other.

13. A cutting blade, the cutting blade comprising:
a cutting blade body comprising a base material of a first hardness, the blade body having opposed first and second surfaces and comprising an outer surface extending around the blade body transversely between the opposed first and second surfaces;
a cutting blade body mounting aperture extending through the opposed first and second surfaces;
a cutting face extending obliquely between the opposed first and second surfaces;
a cutting edge formed at a leading edge of the cutting face; and
a cladding of along one of the first and the second surfaces, the cladding being of a second hardness greater than the first hardness, the cladding arranged at or adjacent to the cutting edge, wherein a plurality of exposed wear locations are formed of the base material and along the cutting edge among the cladding;
wherein the cutting edge is configured to become serrated only after use via the exposed wear locations.

14. The cutting blade of claim 13, wherein cladding comprises a plurality of hardened bead regions that are deposited along the cutting edge and are not machined prior to use.

15. The cutting blade of claim 13, wherein the cladding does not extend beyond an outermost perimeter of the blade body prior to use, other than flash.

16. The cutting blade of claim 13, wherein the first and second hardness and materials of the cladding and the base material are different, and wherein the cladding provides clad regions bordering exposed wear locations and are configured such that the clad regions wear slower such that during use a wave pattern is adapted to be generated along the cutting edge through faster erosion of the exposed wear locations.

17. The cutting blade of claim 13, wherein the cutting blade is configure such that at least 20% of the cutting edge is comprised of the base material before and after use.

18. A method comprising:
providing a cutting blade with a cutting blade body having opposed first and second surfaces; the cutting blade body being formed of a base material, a cutting edge formed into the cutting blade body; the cutting edge extending along an outer edge of the cutting blade body; the cutting blade and the cutting edge are non-serrated in an unused state; and
cladding a hardened material to selective locations along one of the first and second surfaces proximate the cutting edge, the hardened material being harder than the base material, while leaving exposed regions of the base material along the cutting edge to develop a cladding pattern that is configured such that during use the base material is adapted to wear faster than the hardened material so as to form a wave pattern in the cutting edge during use.

19. The method of claim 18, wherein the step of providing the cutting blade with the cutting blade body includes providing the first and second surfaces in opposed space relation and a cutting face that extends from the cutting edge towards a one of the first and second surfaces.

20. The method of claim 19, wherein the step of cladding is done only after the cutting face is formed.

21. The method of claim 20, wherein the step of cladding is done by laser cladding.

* * * * *